United States Patent
Noh et al.

(10) Patent No.: US 9,585,102 B2
(45) Date of Patent: Feb. 28, 2017

(54) METHOD OF CONTROLLING THE TRANSMISSION POWER OF UPLINK CHANNELS AND SIGNALS AND APPARATUSES THEREOF

(71) Applicant: KT CORPORATION, Gyeonggi-do (KR)

(72) Inventors: Min Seok Noh, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/862,343

(22) Filed: Sep. 23, 2015

(65) Prior Publication Data

US 2016/0095069 A1    Mar. 31, 2016

(30) Foreign Application Priority Data

Sep. 26, 2014  (KR) .................. 10-2014-0129603
Feb. 16, 2015  (KR) .................. 10-2015-0023625

(51) Int. Cl.
| | |
|---|---|
| *H04Q 7/10* | (2006.01) |
| *H04W 52/14* | (2009.01) |
| *H04W 52/34* | (2009.01) |
| *H04W 52/36* | (2009.01) |
| *H04L 5/00* | (2006.01) |
| *H04W 52/32* | (2009.01) |

(52) U.S. Cl.
CPC .............. *H04W 52/146* (2013.01); *H04L 5/00* (2013.01); *H04W 52/34* (2013.01); *H04W 52/346* (2013.01); *H04W 52/367* (2013.01); *H04W 52/325* (2013.01)

(58) Field of Classification Search
CPC .............. H04W 52/146; H04W 52/325; H04W 52/367; H04W 72/0413; H04W 72/0426
USPC ........... 455/69, 448, 450, 522; 370/328, 465
See application file for complete search history.

(56) References Cited

U.S. PATENT DOCUMENTS

| 9,332,508 B2 * | 5/2016 | Gaal ................... H04W 52/265 |
| 9,351,259 B2 * | 5/2016 | Suzuki ............... H04W 52/146 |
| 2009/0238241 A1 * | 9/2009 | Hooli .................. H04B 1/7143 |
| | | 375/133 |

(Continued)

FOREIGN PATENT DOCUMENTS

| KR | 10-2010-0088083 A | 8/2010 |
| WO | 2013/048188 A2 | 4/2013 |

*Primary Examiner* — Ajit Patel
*Assistant Examiner* — Julio Perez
(74) *Attorney, Agent, or Firm* — IP Legal Services, LLC

(57) ABSTRACT

Provided are a method and an apparatus for a User Equipment (UE) for multiplexing at least one uplink channel and an uplink signal and for controlling the transmission power for an uplink channel and an uplink signal. A method of a UE for controlling an uplink transmission power may include setting the uplink maximum transmission power for each of a plurality of cell groups including one or more serving cells; and allocating the transmission power for an uplink channel and an uplink signal based on at least one of: the uplink maximum transmission power, a total sum of the transmission power of one or more uplink channels and an uplink signal transmitted in each of the plurality of cell groups, and the total maximum transmission power of the UE, and the uplink channel includes a PUCCH or a PUSCH, and the uplink signal includes a SRS.

9 Claims, 26 Drawing Sheets

(56) References Cited

U.S. PATENT DOCUMENTS

| | | |
|---|---|---|
| 2011/0280169 A1 | 11/2011 | Seo et al. |
| 2011/0287804 A1 | 11/2011 | Seo et al. |
| 2013/0208710 A1 | 8/2013 | Seo et al. |
| 2013/0223392 A1 | 8/2013 | Seo et al. |
| 2014/0050205 A1 | 2/2014 | Ahn et al. |
| 2014/0056271 A1 | 2/2014 | Ahn et al. |
| 2014/0119302 A1* | 5/2014 | Ahn .................. H04L 5/0051 370/329 |
| 2014/0126475 A1 | 5/2014 | Ahn et al. |
| 2014/0219153 A1 | 8/2014 | Seo et al. |
| 2014/0321400 A1 | 10/2014 | Seo et al. |
| 2014/0348108 A1 | 11/2014 | Seo et al. |
| 2014/0349703 A1 | 11/2014 | Seo et al. |
| 2015/0071222 A1 | 3/2015 | Ahn et al. |
| 2015/0230191 A1 | 8/2015 | Seo et al. |
| 2015/0237585 A1 | 8/2015 | Seo et al. |
| 2015/0245356 A1 | 8/2015 | Seo et al. |
| 2015/0365214 A1 | 12/2015 | Ahn et al. |
| 2016/0081043 A1 | 3/2016 | Seo et al. |

* cited by examiner

X: CC0 WHEN SeNB INDEX IS INDEPENDENT, AND
CC2 WHEN SeNB INDEX IS CONNECTED

METHOD OF CONTROLLING THE TRANSMISSION POWER OF UPLINK CHANNELS AND SIGNALS AND APPARATUSES THEREOF

CROSS-REFERENCE TO RELATED APPLICATION

This application claims priority under 35 U.S.C. §119(a) to Korean Application Serial Nos. 10-2014-0129603 & 10-2015-0023625, which were filed in the Korean Intellectual Property Office on Sep. 26, 2014 & Feb. 16, 2015, the entire content of which is hereby incorporated by reference.

BACKGROUND OF THE INVENTION

1. Field of the Invention

The present disclosure relates to a method and apparatus for enabling a User Equipment (UE) to multiplex an uplink channel and an uplink signal and to control transmission power for an uplink channel and an uplink signal. Particularly, the present disclosure relates to a method of a UE for multiplexing and transmitting various uplink channels and uplink signals in a dual connectivity environment where transmission and reception are performed by different Base Stations (BSs), a method of controlling the transmission power of various uplink channels and uplink signals, and an apparatus thereof.

2. Description of the Prior Art

Due to advances in communication systems, various wireless terminals have been introduced to consumers, such as companies and individuals. A current mobile communication system has been affiliated with $3^{rd}$ generation partnership project (3GPP), for example, Long Term Evolution (LTE), LTE-Advanced (LTE-A), and the like. Such a mobile communication system may be capable of transmitting and receiving, at a high speed, a large amount of various data such as multimedia data, image data, and, radio signal, as well as a voice data. Accordingly, there is a demand for developing technology that enables transmitting and receiving a large amount of data at high-speed, as fast as a wired communication network. For efficiently transmitting a large amount of data, transmission of data using a plurality of cells was introduced.

A technology has been introduced for deploying a plurality of small Base Stations (BSs) having a relatively narrow coverage, such as a small cell, so as to transmit a large amount of data at a high speed, and to reliably transmit and receive data in an environment where a plurality of User Equipments (UEs) are concentrated in a predetermined BS.

Also, dual connectivity has been introduced. The dual connectivity enables a UE to communicate using the small cell and an existing macro cell. In the dual connectivity situation, a UE may perform wireless communication with a plurality of BSs.

However, the UE uses a limited uplink transmission power to transmit an uplink channel and an uplink signal. Thus, there are demands i) for discussing a method of multiplexing and transmitting various uplink channels and uplink signals, ii) for discussing a method of distributing the limited transmission power of UE to a plurality of BSs that form dual connectivity, and iii) for defining standards for distributing transmission power to various channels and uplink signals transmitted in parallel. That is, the UE may not transmit an uplink channel and an uplink signal using dual connectivity if it fails to solve the problem associated with the standards for distributing transmission power with respect to each uplink channel and each uplink signal and for transmitting an uplink channel and an uplink signal. Furthermore, the BS may not accurately receive the corresponding uplink channel and the corresponding uplink signal.

SUMMARY OF THE INVENTION

In this background, an aspect of the present disclosure is to provide a method and apparatus for multiplexing and transmitting a plurality of uplink channels and uplink signals when a User Equipment (UE) transmits an uplink channel and an uplink signal in a dual connectivity situation.

Also, another aspect of the present disclosure is to provide a method and apparatus for allocating transmission power to each uplink channel and signal, when a UE transmits a plurality of uplink channels and signals in a dual connectivity situation. Particularly, another aspect of the present disclosure is to provide a method and apparatus for determining a transmission power allocation priority among uplink channels and uplink signals, for transmitting a plurality of uplink channels and signals when an amount of transmission power of a UE is limited.

According to various embodiments of the present disclosure, a method of a User Equipment (UE) for controlling an uplink transmission power is provided. The method includes: setting an uplink maximum transmission power for each of a plurality of cell groups including one or more serving cells; and allocating a transmission power for an uplink channel and an uplink signal based on at least one of the uplink maximum transmission power, a total sum of the transmission power of one or more uplink channels and an uplink signal transmitted in each of the plurality of cell groups, and a total maximum transmission power of the UE, wherein the uplink channel includes a Physical Uplink Control Channel (PUCCH) or a Physical Uplink Shared Channel (PUSCH), and the uplink signal includes a Sounding Reference Signal (SRS).

According to various embodiments of the present disclosure, a method of a Base Station (BS) for receiving an uplink channel and an uplink signal is provided. The method includes: configuring dual connectivity with respect to a User Equipment (UE); and receiving an uplink channel and an uplink signal from the UE, wherein the uplink channel and the uplink signal are transmitted at a transmission power allocated based on at least one of an uplink maximum transmission power of each of a plurality of cell groups including one or more serving cells, a total sum of the transmission power of the uplink channel and the uplink signal, and a total maximum transmission power of the UE; and the uplink channel includes a Physical Uplink Control Channel (PUCCH) or Physical Uplink Shared Channel (PUSCH), and the uplink signal includes Sounding Reference Signal (SRS).

According to various embodiments of the present disclosure, a UE for controlling an uplink transmission power is provided. The UE includes: a controller and a transmitting unit. The controller is configured to set an uplink maximum transmission power for each of a plurality of cell groups including one or more serving cells and configured to allocate a transmission power for an uplink channel and an uplink signal, based on at least one of the uplink maximum transmission power, a total sum of the transmission power of one or more uplink channels and an uplink signal transmitted in each of the plurality of cell groups, and a total maximum transmission power of the UE. The transmitting unit is configured to transmit the uplink channel and the uplink signal, based on the allocated transmission power.

The uplink channel includes a Physical Uplink Control Channel (PUCCH) or a Physical Uplink Shared Channel (PUSCH), and the uplink signal includes a Sounding Reference Signal (SRS).

According to various embodiments of the present disclosure, a BS for receiving an uplink channel and an uplink signal is provided. The BS includes a controller and a receiving unit. The controller is configured to form dual connectivity with respect to a UE. The receiving unit is configured to receive an uplink channel and an uplink signal. The uplink channel and the uplink signal are transmitted at a transmission power allocated based on at least one of an uplink maximum transmission power of each of a plurality of cell groups including one or more serving cells, a total sum of the transmission power of an uplink channel and an uplink signal, and a total maximum transmission power of the UE, and the uplink channel includes a Physical Uplink Control Channel (PUCCH) or a Physical Uplink Shared Channel (PUSCH), and the uplink signal includes a Sounding Reference Signal (SRS).

As described above, according to the present disclosure, there are provided a method and an apparatus for multiplexing and transmitting a plurality of uplink channels and uplink signals when a UE transmits an uplink channel and an uplink signal in a dual connectivity situation.

Also, according to the present disclosure, there are provided a method and an apparatus for allocating transmission power to each uplink channel and uplink signal when a UE transmits a plurality of uplink channels and uplink signals. Particularly, according to the present disclosure, there are provided a method and apparatus for determining a transmission power allocation priority among uplink channels and uplink signals, for transmitting a plurality of uplink channels and uplink signals when an amount of transmission power of the UE is limited.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
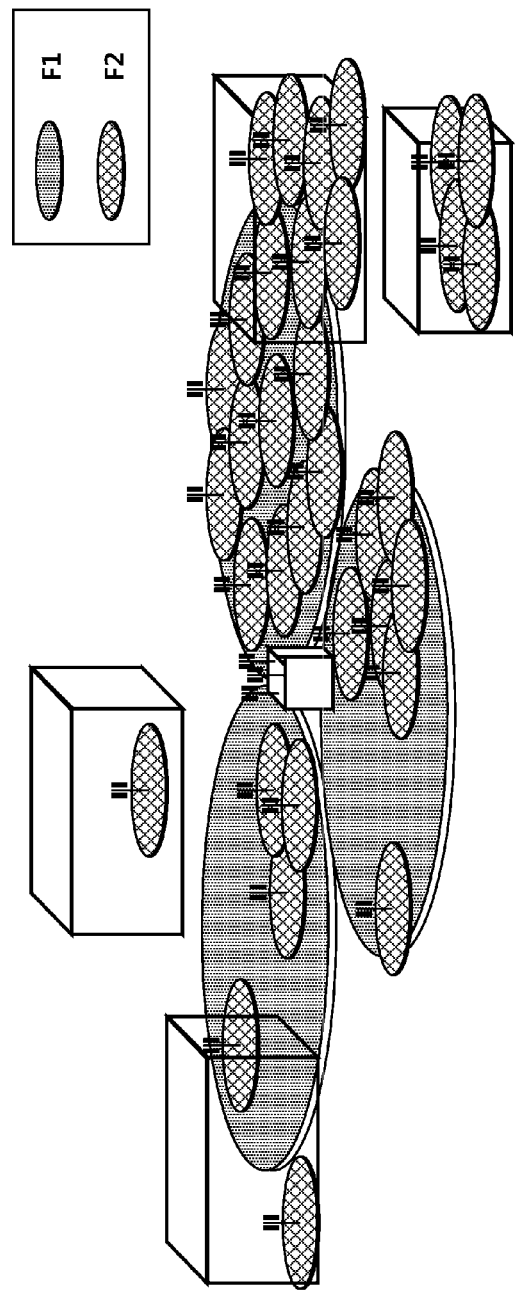
FIG. 1 is a diagram illustrating a small cell deployment according to an embodiment.

Hereinafter, embodiments of the present disclosure will be described with reference to the accompanying drawings. In the following description, the same to components will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, a data service, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in GSM.

A base station or a cell may generally refer to a station where communication with a User Equipment (UE) is performed. The base station or the cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station 20 or the cell may be construed as an inclusive concept indicating a portion of an area covered by a BSC (Base Station Controller) in CDMA, a NodeB in WCDMA, an eNB or a sector (site) in LTE, and the like. The concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a megacell, a macrocell, a microcell, a picocell, a femtocell, and a small cell in association with a wireless area; and ii) the base station may indicate a wireless area itself. In case of i), such a base station may denote devices providing a predetermined wireless service area and controlled by the identical entity and devices interacting with one another to cooperatively configure the wireless service area. Based on a configuration type of a wireless service area, an eNB, an RRH, an antenna, an RU, a Low Power Node (LPN), a point, a transmission/reception point, a transmission point, a reception point, and the like may be embodiments of a base station. In case of ii), a base station may denote a wireless area itself that receives or transmits a signal from a perspective of a terminal or a neighboring base station.

Therefore, a megacell, a macrocell, a microcell, a picocell, a femtocell, a small cell, an RRH, an antenna, an RU, an LPN, a point, an eNB, a transmission/reception point, a transmission point, and a reception point may be commonly referred to as a base station.

In the specifications, the user equipment and the base station are used as two inclusive transceiving subjects to embody the technology and technical concepts described in the specifications, and the user equipment and the base station may not be limited to a predetermined term or word. Here, Uplink (UL) refers to a scheme for a UE to transmit data to and receive data from a base station, and Downlink (DL) refers to a scheme for a base station to transmit data to and receive data from a UE.

Varied multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present disclosure may be applicable to resource allocation in an asynchronous wireless communication scheme that is advanced through global system for mobile communications (GSM), WCDMA, and HSPA, to be LTE and LTE-advanced, and may be applicable to resource allocation in a synchronous wireless communication scheme that is advanced through CDMA and CDMA-2000, to be ultra-mobile broadband (UMB). The present disclosure may not be limited to a specific wireless communication field, and the present disclosure may include all technical fields in which the technical idea of the present disclosure is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), an EPDCCH (Enhanced Physical Downlink Control CHannel), and the like. The uplink and the downlink may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multiple transmission/reception points to a UE, and an uplink refers to communication or a communication path from a UE to multiple transmission/reception points. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, signal transmission and reception through a PUCCH, a PUSCH, a PDCCH, a PDSCH, or the like may be described as the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a downlink control channel used herein may indicate a PDCCH or an EPDCCH, and the downlink control may indicate a meaning including both a PDCCH and an EPDCCH.

In addition, for ease of description, an EPDCCH, which corresponds to an embodiment of the present disclosure, may be applied to the part described using a PDCCH and to the part described using an EPDCCH.

Hereinafter, higher layer signaling includes an RRC signaling that transmits RRC information including an RRC parameter.

An eNB performs downlink transmission to terminals. The eNB 110 may transmit a Physical Downlink Shared Channel (PDSCH) which is the primary physical channel for unicast transmission. The eNB 110 may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

Hereinafter, a small cell deployment scenario according to the present disclosure will be described.

FIG. 1 is a diagram illustrating a small cell deployment according to an embodiment.

Figure 2:
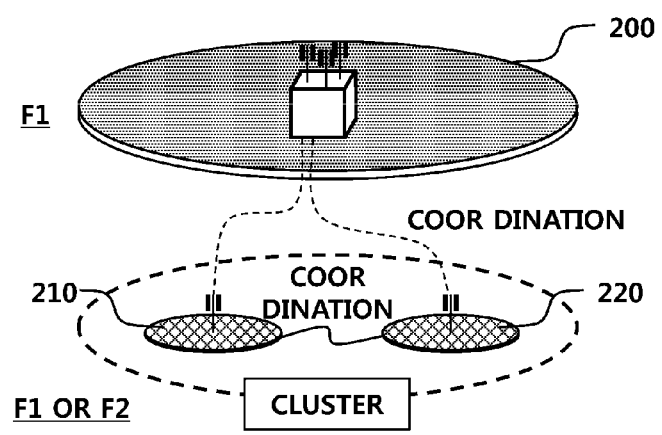
FIG. 2 is a diagram illustrating a small cell deployment scenario.
Figure 3:
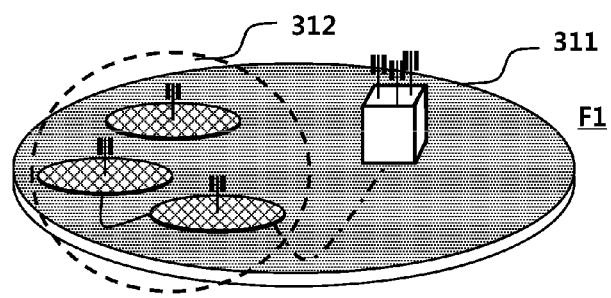
FIG. 3 through FIG. 6 are diagrams illustrating detailed scenarios of a small cell deployment.
Figure 3:
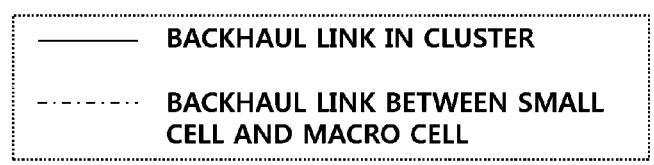

FIG. 1 illustrates cell configuration where a small cell and a macro cell coexist. FIG. 2 and FIG. 3 illustrate cell configurations distinguished based on whether a macro coverage exists, whether a corresponding small cell is an outdoor cell or an indoor cell, whether the deployment of a corresponding small cell is sparse or dense, and whether a corresponding small cell uses a frequency spectrum identical to a macro cell from the perspective of the spectrum.

FIG. 2 is a diagram illustrating a small cell deployment scenario. FIG. 2 illustrates general cell configuration of the scenario of FIG. 3. FIG. 2 illustrates a small cell deployment scenario including scenarios #1, #2a, #2b, and #3. The diagram 200 indicates a macro cell, and the diagrams 210 and 220 indicate small cells. In FIG. 2, an overlaid macro cell may or may not exist. Coordination may be performed between the macro cell 200 and the small cell 210 and 220.

Coordination may be performed between the small cells 210 and 220. An overlap area among the macro cell 200, the small cell 210, and the small cell 220 may be bound as a cluster.

FIG. 3 through FIG. 6 are diagrams illustrating detailed scenarios of a small cell deployment.

FIG. 3 illustrates scenario #1 of the small cell deployment. Scenario #1 corresponds to a co-channel deployment scenario of a small cell and a macro cell, including an overlaid macro and scenario #1 corresponds to an outdoor small cell scenario. The diagram 310 indicates a case in which all of a macro cell 311 and small cells are outdoor cells, and the diagram 312 indicates a small cell cluster. Users are distributed in both the indoor and outdoor cells.

Solid lines connecting small cells in the small cell cluster 312 indicate a backhaul link within a cluster. A broken line connecting a Base Station (BS) of the macro cell and the small cells in the cluster indicates a backhaul link between small cells and a macro cell.

Figure 4:
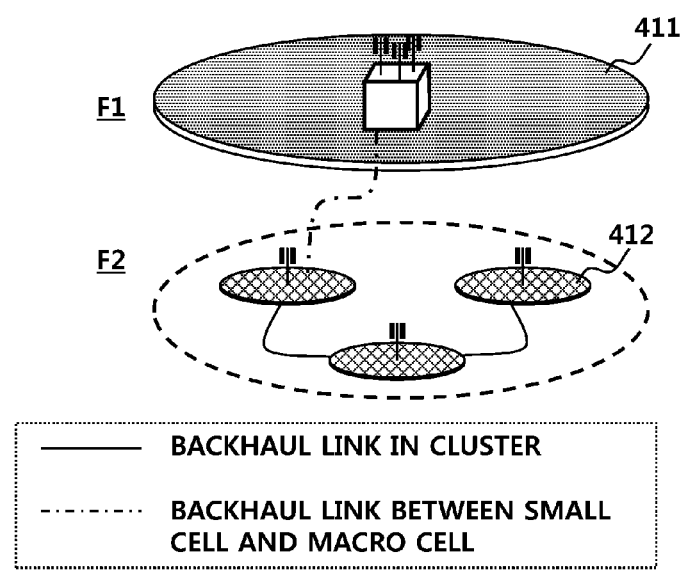

FIG. 4 illustrates small cell deployment scenario #2a. Scenario #2a corresponds to a deployment scenario in which a small cell and a macro cell use different frequency spectrums, including an overlaid macro, and corresponds to an outdoor small cell scenario. A macro cell 411 and small cells are outdoor cells, and the diagram 412 indicates a small cell cluster. Users are distributed in both the indoor and outdoor cells.

Solid lines connecting small cells in the small cell cluster 412 indicate a backhaul link within a cluster. A broken line connecting a BS of the macro cell and the small cells in the cluster indicates a backhaul link between small cells and a macro cell.

Figure 5:
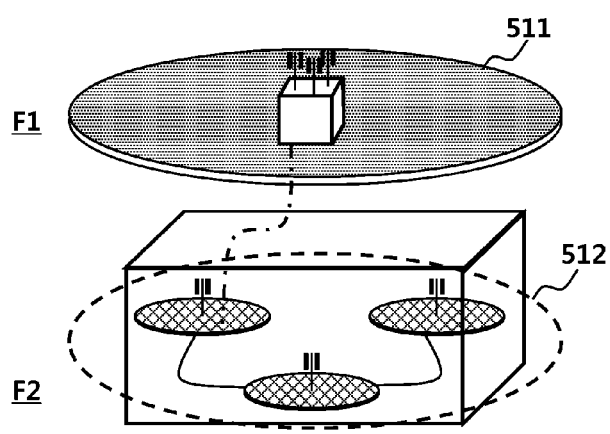
Figure 5:
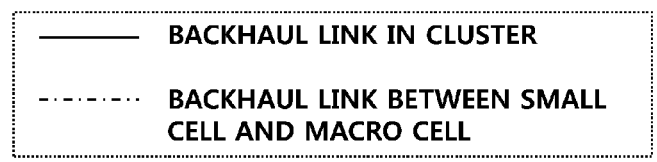

FIG. 5 illustrates small cell deployment scenario #2b. Scenario #2b corresponds to a deployment scenario in which a small cell and a macro cell use different frequency spectrums, including an overlaid macro, and corresponds to an indoor small cell scenario. A macro cell 511 is an outdoor cell and all small cells are indoor cells, and the diagram 512 indicates a small cell cluster. Users are distributed in both the indoor and outdoor cells.

Solid lines connecting small cells in the small cell cluster 512 indicate a backhaul link within a cluster. A broken line connecting a BS of the macro cell and the small cells in the cluster indicates a backhaul link between small cells and a macro cell.

Figure 6:
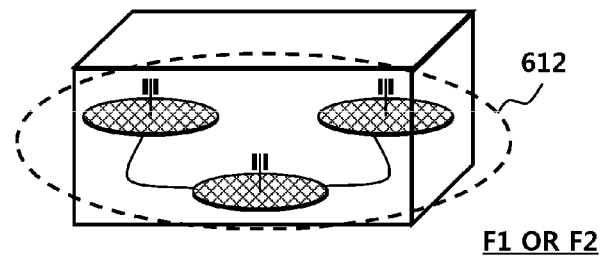
Figure 6:

FIG. 6 illustrates scenario #3 of the small cell deployment. Scenario #3 corresponds to an indoor small cell scenario under the assumption that the coverage of a macro does not exist. The diagram 612 indicates a small cell cluster. In addition, all small cells are indoor cells, and users are distributed in both the indoor and outdoor cells.

Solid lines connecting small cells in the small cell cluster 612 indicate a backhaul link within a cluster. A broken line connecting a base station of the macro cell and the small cells in the cluster indicates a backhaul link between small cells and a macro cell.

Frequencies F1 and F2 used in FIG. 1 and the above described various small cell scenarios of FIG. 2 to FIG. 6, may be frequencies that support an identical duplex mode. Alternatively, frequencies F1 and F2 may have different duplex modes. For example, frequency F1 is a frequency that supports an FDD mode, and frequency F2 is a frequency that supports a TDD mode, or an opposite case may be considered.

Figure 7:
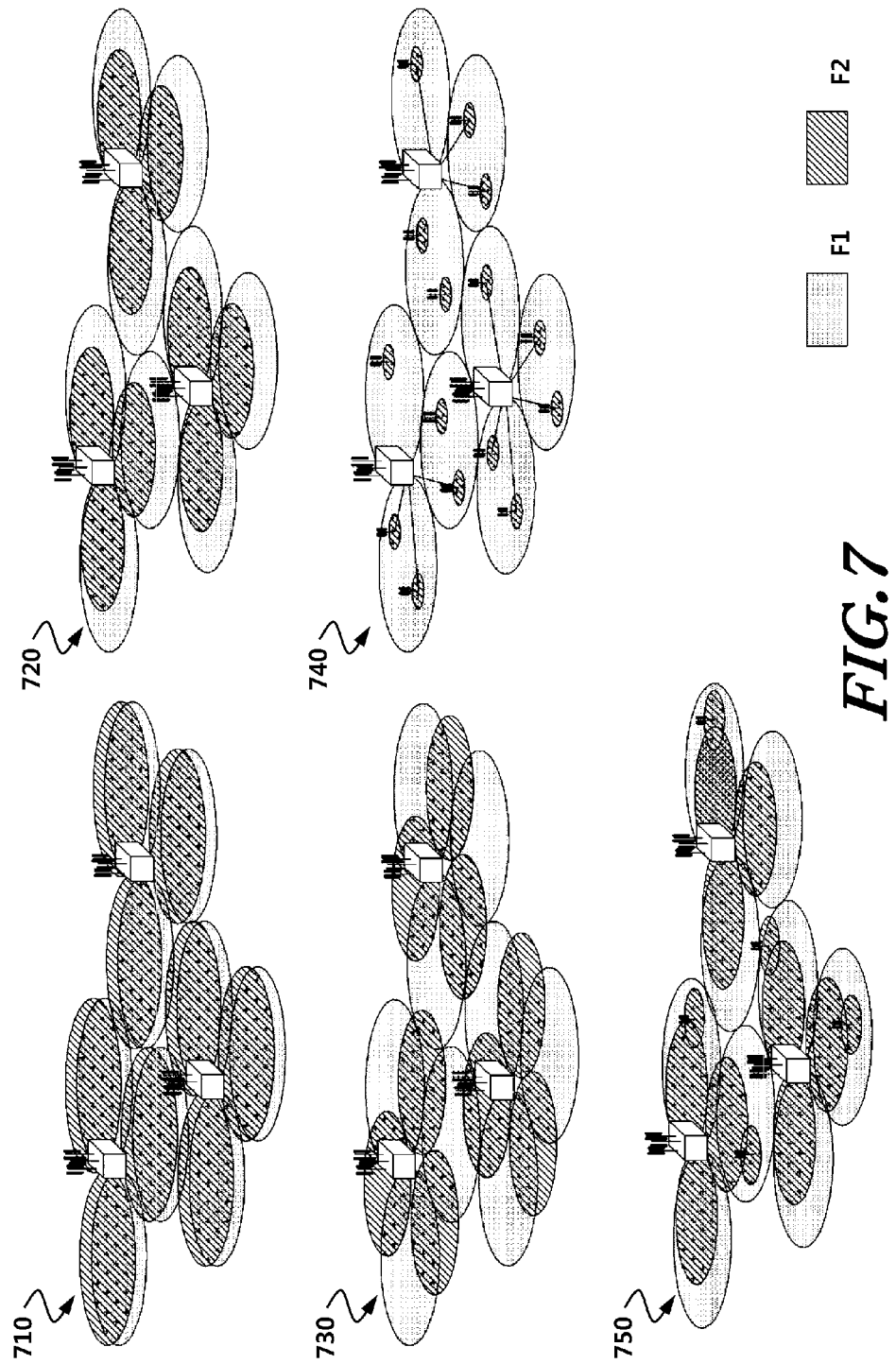
FIG. 7 is a diagram illustrating various scenarios of Carrier Aggregation (CA)

FIG. 7 is a diagram illustrating various scenarios of carrier aggregation.

Even in the carrier aggregation scenario, as shown in FIGS. 7, F1 and F2 may denote frequencies that support an identical duplex mode, or F1 and F2 may denote frequencies that support different duplex modes.

In the diagram 710, F1 and F2 cells are co-located in an almost identical coverage and are overlaid. In the scenario, two layers provide sufficient coverage and mobility, and aggregation between the overlaid F1 and F2 cells is possible.

In the diagram 720, although F1 and F2 cells are co-located and overlaid, the coverage of F2 is relatively smaller than that of F1. In the scenario, F1 has a sufficient coverage and mobility is supported based on the F1 coverage, and F2 is used for improving throughput, and aggregation between overlaid F1 and F2 cells is possible.

In the scenario corresponding to the diagram 730, although F1 and F2 cells are co-located, F2 antennas are directed to a cell edge in order to increase a cell edge throughput. In this scenario, although the mobility is supported based on the F1 coverage and F1 has a sufficient coverage, F2 potentially has a coverage hole, and F1 and F2 cells in an identical eNB may be aggregated in a place where the coverages are overlaid.

In the scenario of the diagram 740, F1 has a macro coverage and an RRH of F2 is used for improving throughput in a hot spot, the mobility is supported based on the F1 coverage, and an F1 macro cell and F2 RRHs cell may be aggregated.

The diagram 750 corresponds to a scenario where frequency-selective-repeaters are deployed for extending the coverage of a single carrier, similar to the scenario of the diagram 720. In the scenario, F1 and F2 cells in an identical eNB may be aggregated in a place where the coverages are overlaid.

As an example of an uplink channel, a Physical Uplink Control Channel (PUCCH) that is used as an uplink control channel will be briefly described. The format of the PUCCH may be classified based on a type of information sent from a UE. The types of formats of a PUCCH and the purpose of its use will be described as follows.

PUCCH format 1: a channel format that transmits only a Scheduling Request (SR)

PUCCH format 1 a/1b: a channel that transmits a Scheduling Request (SR) and/or response information (for example, Ack/Nack) in response to a downlink data channel, and is classified into format 1a and 1b based on the number of bits of Ack/Nack and a modulation scheme.

Shortened PUCCH format 1a/1b: a format obtained by puncturing the last SC-FDMA symbol of a subframe from PUCCH format 1a/1b that transmits Ack/Nack. Whether to use the corresponding format is determined based on an RRC parameter indicated by a higher layer of a BS, whether ackNackSRS-SimultaneousTransmission is TRUE/FALSE, and cell-specific information configuration of a Sounding Reference Signal (SRS).

PUCCH format 2: a channel format that transmits only a Channel Quality Indication (CQI)

PUCCH format 2a/2b: a channel that transmits CQI+Ack/Nack in response to a downlink data channel, and is classified into 2a and 2b based on the number of bits of Ack/Nack and a modulation scheme PUCCH format 3: a channel that transmits Ack/Nack of 4 bits or more, under the downlink carrier aggregation Shortened PUCCH format 3: a format obtained by puncturing the last SC-FDMA symbol of a subframe from PUCCH format 3 that transmits Ack/Nack. Whether to use the corresponding format is determined based on an RRC parameter indicated by a higher layer of a BS, whether ackNackSRS-SimultaneousTransmission is TRUE/FALSE, and cell-specific information configuration of an SRS.

Hereinafter, when a single serving cell transmits a PUCCH without considering multiple PUCCHs, a method for a UE to control transmission power for an uplink channel and an uplink signal under carrier aggregation, will be described. Particularly, a method of controlling power between uplink transmission channels, between an uplink channel and a sound reference signal, and between sound reference signals when the power for a UE is limited (power limited case) and when the power for the UE is not limited (non-power limited case) will be described based on parts related to the present disclosure.

When the total sum of transmission power of a UE configured for simultaneous transmission of a PUCCH and a PUSCH is greater than $\hat{P}_{CMAX}(i)$, the UE is configured to prioritize the transmission power of a PUCCH when determining the transmission power of a PUSCH for a serving cell c. The UE allocates the transmission power of the PUCCH and scales the transmission power of the PUSCH using a value in the range between 0 and 1 with respect to the remaining transmission power, so as to determine the transmission power of the PUSCH. That is, the UE determines the transmission power of a corresponding PUSCH using Equation 1.

$$\sum_c w(i) \cdot \hat{P}_{PUSCH,c}(i) \leq \left(\hat{P}_{CMAX}(i) - \hat{P}_{PUCCH}(i)\right) \quad \text{[Equation 1]}$$

$\hat{P}_{PUCCH}(i)$ is a linear value of $P_{PUCCH}(i)$, $\hat{P}_{PUSCH,c}(i)$ is a linear value of $P_{PUSCH,c}(i)$, and $\hat{P}_{CMAX}(i)$ is a linear value of $P_{CMAX}(i)$ which is a total maximum output power $P_{CMAX}(i)$ configured for a UE in subframe i. w(i) is a scaling factor of $\hat{P}_{PUSCH,c}(i)$ for the serving cell c, and has a value in the range between 0 and 1.

When the total sum of transmission power of the UE is greater than $\hat{P}_{CMAX}(i)$, the UE determines the transmission power of PUSCHs transmitted over different carriers or different serving cells, based on whether information included in a corresponding PUSCH includes Uplink Control Information (UCI) or not. Particularly, PUSCH transmission power is preferentially allocated to a serving cell or a component carrier that transmits a PUSCH including UCI, and PUSCH transmission power is determined for the remaining serving cell(s) or component carriers by performing scaling using an identical scaling factor. Here, a scaling factor may be set to 0 with respect to a predetermined serving cell(s) or component carrier. That is, the UE determines the transmission power of a corresponding PUSCH using Equation 2.

$$\sum_{c \neq j} w(i) \cdot \hat{P}_{PUSCH,c}(i) \leq \left(\hat{P}_{CMAX}(i) - \hat{P}_{PUSCH,j}(i)\right) \quad \text{[Equation 2]}$$

When the UE transmits a PUSCH containing UCI in a serving cell j and transmits a PUSCH without UCI in the remaining serving cell(s), and a sum of the transmission power for transmitting the corresponding PUSCHs exceeds the total transmission power $\hat{P}_{CMAX}(i)$ of the UE, the UE may allocate transmission power based on Equation 2. $\hat{P}_{PUSCH,j}(i)$ is the PUSCH transmission power for a cell including UCI, and w(i) is a scaling factor of $\hat{P}_{PUSCH,c}(i)$ for the serving cell c without UCI.

In the case where the total sum of the transmission power of the UE exceeds $\hat{P}_{CMAX}(i)$, when the UE determines the transmission power of a PUCCH, a PUSCH with UCI and PUSCHs without UCI, which are transmitted over different carriers or different serving cells, the UE preferentially secures the transmission power of the PUCCH, subsequently secures the transmission power of a PUSCH having UCI, and determines PUSCH transmission power by performing scaling with respect to the remaining transmission power of the UE using an identical scaling factor for the remaining serving cells (s) or component carriers. Here, a scaling factor may be set to 0 with respect to a predetermined serving cell(s) or component carrier. That is, the UE determines the transmission power of a corresponding PUSCH using Equation 3.

$$\hat{P}_{PUSCH,j}(i) = \min\left(\hat{P}_{PUSCH,j}(i), \left(\hat{P}_{CMAX}(i) - \hat{P}_{PUCCH}(i)\right)\right) \quad \text{[Equation 3]}$$

and $$\sum_{c \neq j} w(i) \cdot \hat{P}_{PUSCH,c}(i) \leq \left(\hat{P}_{CMAX}(i) - \hat{P}_{PUCCH}(i) - \hat{P}_{PUSCH,j}(i)\right)$$

In the case where the total sum of transmission power of the UE exceeds when the UE determines the transmission power of SRSs transmitted over different carriers or different serving cells, the UE determines the transmission power of SRSs by performing scaling using an identical scaling factor for the serving cell(s) or component carriers. That is, the UE determines the transmission power of corresponding SRSs using Equation 4.

$$\sum_c w(i) \cdot \hat{P}_{SRS,c}(i) \leq \hat{P}_{CMAX}(i) \quad \text{[Equation 4]}$$

In Equation 4, $\hat{P}_{SRS,c}(i)$ is a linear value of $P_{SRS,c}(i)$, $\hat{P}_{CMAX}(i)$ is a linear value of $P_{CMAX}(i)$ which is a total maximum output power configured for the UE in subframe i. w(i) is a scaling factor of $\hat{P}_{SRS,c}(i)$ for the serving cell c, and has a value in the range between 0 and 1.

Dual Connectivity

Figure 8:
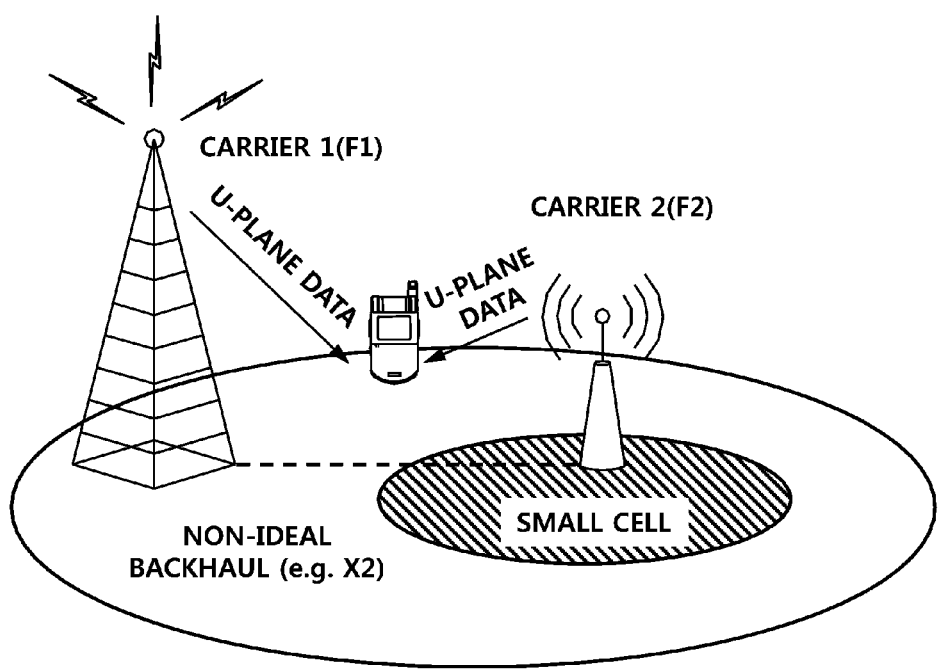
FIG. 8 is a diagram exemplary illustrating a dual connectivity scenario to which embodiments of the present disclosure are applied.

FIG. 8 is a diagram illustrating an example of a dual connectivity scenario to which the present disclosure is applied.

The scenario of FIG. 8 is associated with an inter-node radio resource aggregation for improving a transmission rate with respect to a UE from different nodes under dual connectivity, which is associated with the aggregation of radio resources through one or more BSs for user plane data transmission.

The dual connectivity refers to an operation in which an RRC-connected UE uses radio resources provided by at least two different network points (for example, a Master eNB and a Secondary eNBs) that are connected through a non-ideal backhaul. In the dual connectivity, a Master eNB refers to a BS that terminates S1-MME and acts as a mobility anchor with respect to a Core Network (CN). The Master eNB may be referred to as a master BS, an MeNB, a Macro eNB, or a macrocell eNB. In the dual connectivity, a secondary BS (Secondary eNB) refers to a BS that provides additional radio resources for a UE and is different from the Master eNB. The Secondary eNB may be referred to as a secondary BS, an SeNB, a small cell eNB, a small eNB, or an assisting eNB. In this instance, a group of serving cells associated with the MeNB is referred to as a Master Cell Group (MCG), and a group of serving cells associated with the SeNB is referred to as a Secondary Cell Group (SCG). Here, an associated serving cell may refer to a serving cell provided by a corresponding BS.

The SeNB may have a special cell containing at least a PUCCH. That is, at least one serving cell associated with the SeNB may have a configured uplink. One of them may be configured with PUCCH resources (At least one cell in SeNB has configured UL and one of them is configured with PUCCH resources).

Figure 9:
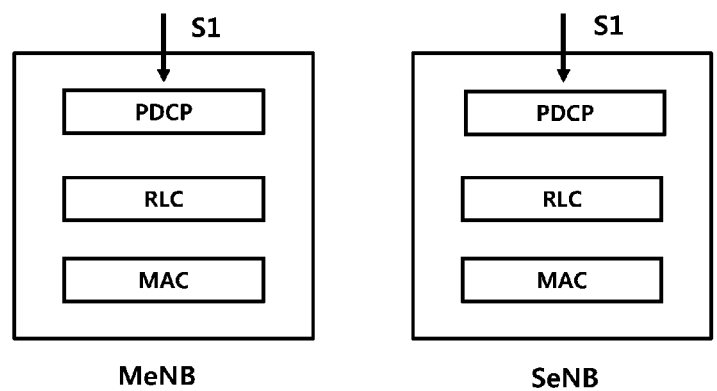
FIG. 9 is a diagram exemplary illustrating dual connectivity.

FIG. 9 is a diagram illustrating an example of a structure of dual connectivity.

FIG. 9 exemplary illustrates the structure of dual connectivity that uses radio resources provided by two BSs connected over a non-ideal backhaul. When the dual connectivity is configured to a UE, like the structure of FIG. 9, a UE may configure a predetermined BS-dedicated bearer. As an example, the UE may configure a MeNB-dedicated data radio bearer (MCG radio bearer) for a voice service and may configure a SeNB-dedicated data radio bearer (SCG radio bearer) for the Internet service. Only a single BS may have a PDCP entity, an RLC entity, and a MAC entity with respect to the predetermined MCG data radio bearer or the predetermined SCG radio bearer. The UE may include entities that have peering with the entities in the UE.

Figure 10:
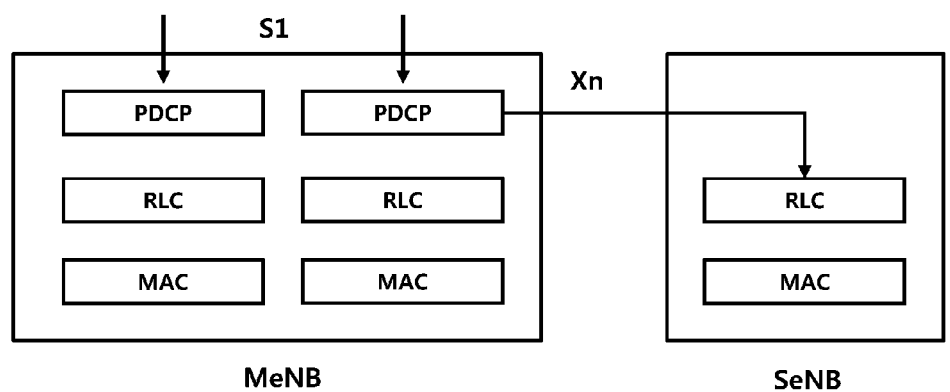
FIG. 10 is a diagram exemplary illustrating dual connectivity.

FIG. 10 is a diagram illustrating another example of a structure of dual connectivity.

FIG. 10 exemplary illustrates another structure of dual connectivity that uses radio resources provided by two BSs connected over a non-ideal backhaul. When the dual connectivity is configured with respect to a UE, like the structure of FIG. 10, the UE may configure a bearer by splitting a predetermined data radio bearer through two BSs (MeNB and SeNB). Hereinafter, a bearer configured by splitting through the two BSs is referred to as a split radio bearer (MCG-SCG radio bearer) or a split bearer. Each BS may have an independent RLC entity (the MeNB has a MeNB RLC entity and the SeNB has a SeNB RLC entity) and an independent MAC entity (the MeNB has a MeNB MAC entity and the SeNB has a SeNB MAC entity), for a predetermined split data radio bearer. The UE may include entities that have peering with the entities in the UE.

In the present disclosure, as a UE configures dual connectivity, a BS that forms an RRC connection with the UE and provides a cell (for example, a PCell) which is a reference of a handover or a BS that terminates S1-MME and acts as a mobility anchor with respect to a core network, will be described as a master BS (MeNB) or a first BS, as occasion demands.

The master BS or the first BS may be a BS that provides a macro cell and may be a BS that provides any one small cell under the situation of dual connectivity with the small cell.

A secondary BS or a second BS may be a BS that provides an additional radio resource to a UE, which is distinguished from a master BS, in a dual connectivity environment.

Each of the first BS (master BS) and the second BS (secondary BS) may provide at least one cell to each UE, and the first BS and the second BS may be connected through an interface between the first BS and the second BS.

For ease of description, a cell associated with the first BS may be described as a macro cell, and a cell associated with the second BS may be described as a small cell. However, in the small cell cluster scenario as provided below, a cell associated with the first BS may also be described as a small cell.

In the present disclosure, a macro cell may indicate each of at least one cell or may indicate overall cells associated with the first BS. Also, a small cell may also indicate each of at least one cell or may indicate overall cells associated with the second BS. However, as described above, in a predetermined scenario such as the small cell cluster, this may be a cell associated with the first cell. In this instance, a cell of the second BS may be described as another small cell or still another small cell.

Hereinafter, for ease of description, a macro cell will be described as a master BS or a first BS and a small cell will be described as a secondary BS or a second BS. However, the present disclosure is not limited thereto. For example, a secondary base station or a second base station may be described as a macro cell and a master base station or a first base station may be described as a small cell.

Additionally, an uplink channel and an uplink signal in the present specification may refer to all channels or signals that a UE transmits to a BS. For example, the uplink channel should be construed as a meaning that includes a channel that a UE transmits to a BS, such as a PUCCH, a PUSCH, and the like. Also, the uplink signal may be construed as a meaning that includes a signal that a UE transmits to a BS such as an SRS. Additionally, the uplink channel and the uplink signal may refer to various channels or signals that a UE transmits to a BS. As occasion demands, the PUCCH and the PUSCH may be described as an uplink channel, and the SRS may be described as an uplink signal. Alternatively, as occasion demands, the PUCCH, the PUSCH, and the SRS may be described as an uplink signal.

Under the carrier aggregation which is different from dual connectivity, when a UE simultaneously transmits uplink data, a control channel, and an uplink signal to a BS, only PUCCH transmission in a single serving cell (e.g., a primary serving cell (PCell)) has been considered and PUCCH transmission in a serving cell different from the PCell has not been considered. Also, only the case in which multiple cells or component carriers are configured under a single BS has been considered, and the case in which different BSs configure multiple cells or component carriers, and a cell for each BS or each cell group transmits a PUCCH under different BSs, has not been considered. Therefore, as in the dual connectivity environment, when transmission of a PUCCH in a PCell of the MeNB, transmission of a PUCCH in another serving cell, and transmission of a PUCCH in a serving cell of the SeNB, which executes a part of the PCell function, are considered, a method of multiplexing an uplink channel or an uplink signal or a power controlling method needs to be newly defined and applied. That is, ambiguity may occur when a UE transmits uplink data, a control channel, and an uplink signal to a BS, and thus, both the BS and the UE may fail to recognize how the UE operates. Therefore, when multiple PUCCHs are configured, a multiplexing method and a power controlling method associated with combinations of an uplink channel (PUCCH, PUSCH, and PRACH) and an uplink signal (SRS) transmitted by a UE may need to be newly defined.

Also, under the dual connectivity, the UE may transmit each or a combination of a PUCCH, a PUSCH, and an SRS to different BSs or different cell groups. In the situation where the total maximum transmission power that the UE may use for transmission is limited, when transmission to different BSs or different cell groups is considered, a multiplexing method and a power controlling method associated with transmission of each or a combination of a PUCCH, a PUSCH, and an SRS, which the UE transmits to different BSs or different cell groups, may need to be newly defined.

In the above described background, in the case where PUCCH transmission in a serving cell that is different from a PCell under a small cell environment is considered (that is, the case where dual connectivity is configured, in which transmission to different BSs (a Master eNB (MeNB) and a Secondary eNB (SeNB)) or reception from different BSs (an MeNB and an SeNB) is possible), the present disclosure proposes a method of multiplexing uplink channels or signals in serving cells (cell group) under an identical BS or in serving cells of different BSs when a UE is configured to transmit an uplink channel or a signal to different BSs. Also, a power controlling method of the UE and an apparatus thereof will be provided. When a PCell for transmitting a PUCCH is configured in a Master Cell Group (MCG) and a cell for transmitting a PUCCH is configured in a Secondary Cell Group (SCG), the present disclosure provides a multiplexing method or a power controlling method and an apparatus thereof, which is configured to enable a UE to simultaneously transmit an uplink channel and a signal in association with the combinations of an uplink channel (PUCCH, PUSCH, and PRACH) and an uplink signal (SRS) transmitted by the UE.

Also, when the transmission of each or a combination of a PUCCH, a PUSCH, and an SRS to different BSs or different cell groups is considered under dual connectivity, the present disclosure provides a multiplexing method, a transmission power controlling method, and an apparatus thereof, which is for controlling transmission power under a limited total maximum transmission power of a UE in association with the transmission of each or a combination of a PUCCH, a PUSCH, and a SRS to different BSs or different cell groups.

Hereinafter, a multiplexing method and a transmission power controlling method for transmission of an uplink channel and an uplink signal under the dual connectivity situation will be described with reference to each embodiment. That is, a method of multiplexing uplink channel signals when different cell groups are configured for a UE, a method of multiplexing uplink channel signals when dual connectivity is configured for a UE, or a method of multiplexing uplink channel signal when multiple PUCCHs are configured for a UE will be described.

As described above, a UE may determine uplink maximum transmission power independently for each cell group. Also, based on the uplink maximum transmission power determined in each cell group, the UE may determine the transmission power of an uplink channel and an uplink signal.

As described with reference to Equations 1 to 4, when the transmission power of an uplink channel and an uplink signal are independently applied in each cell group, each cell group may have an independent RRC parameter as a method for enabling a UE configuring dual connectivity to support multiplexing an uplink channel and an uplink signal, to be transmitted to different types of cell groups (for example, an MCG and an SCG) or different BSs (for example, an MeNB and an SeNB). That is, a method of configuring an independent RRC parameter for each cell group may be considered, in association with the four following parameters that are configured to indicate information, which is required to be supported as an operation of a UE, through RRC parameters.

Method 1: a method of configuring ackNackSRS-SimultaneousTransmission independently for each cell group, wherein ackNackSRS-SimultaneousTransmission is an RRC parameter that indicates simultaneous transmission of a PUCCH format and an SRS, and the PUCCH format is capable of transmitting Ack/Nack through PUCCH format 1/1a/1b and PUCCH format 3.

For example, in the same manner that configures ackNackSRS-SimultaneousTransmission for a master cell group and that configures ackNackSRS-SimultaneousTransmission for a secondary cell group, an RRC parameter indicating simultaneous transmission of Ack/Nack and an SRS may be configured for each cell group. Alternatively, in the same manner that configures ackNackSRS-SimultaneousTransmission for the master BS and that configures ackNackSRS-SimultaneousTransmission for the secondary BS, an RRC parameter indicating simultaneous transmission of Ack/Nack and an SRS may be configured for each BS that forms each cell group.

That is, a PUCCH may be transmitted in a single cell for each cell group. Thus, it is the method of setting for multiplexing a PUCCH and an SRS using the mechanism described with reference to Equations 1 to 4 when the simultaneous transmission of Ack/Nack and an SRS is set in each group. For example, a single cell capable of transmitting a PUCCH for each cell group may be a PCell in an MCG, and the single cell may be a special SCell (a special PCell or a sPCell or a PSCell) in an SCG.

For another example, setting may be performed not to allow a UE to perform the simultaneous transmission of a PUCCH and an SRS in an SCG, under dual connectivity. In this situation, ackNackSRS-SimultaneousTransmission for the corresponding SCG or SeNB may not be needed. However, even in this instance, an operation of simultaneously transmitting a PUCCH that transmits Ack/Nack and an SRS according to ackNackSRS-SimultaneousTransmission should be applied only to an MCG or MeNB. Therefore, for a UE configuring dual connectivity, ackNackSRS-SimultaneousTransmission, which is a corresponding RRC parameter, may need to be indicated by being changed into ackNackSRS-SimultaneousTransmission for an MCG or ackNackSRS-SimultaneousTransmission for an MeNB. Alternatively, the corresponding parameter may be used as it is. In this instance, a BS may provide an indication so that a UE configuring dual connectivity is configured to use ackNackSRS-SimultaneousTransmission, which is the existing RRC parameter, only for an MeNB or an MCG.

Method 2: a method of configuring simultaneousAckNackAndCQI independently for each cell group, wherein simultaneousAckNackAndCQI is an RRC parameter indicating simultaneous transmission of Ack/Nack and CQI through PUCCH 2/2a/2b.

For example, in the same manner of configuring simultaneousAckNackAndCQI for a master cell group and configuring simultaneousAckNackAndCQI for a secondary cell group, an RRC parameter indicating the simultaneous transmission of Ack/Nack and a CQI may be configured for each cell group. As an example, in the same manner of configuring simultaneousAckNackAndCQI for a master BS and configuring simultaneousAckNackAndCQI for a secondary BS, an RRC parameter indicating the simultaneous transmission of Ack/Nack and a CQI may be configured for each BS that forms a cell group.

That is, a PUCCH can be transmitted in a single cell for each cell group. Thus, it is the method of setting for multiplexing Ack/Nack and a CQI using the mechanism described with reference to Equations 1 to 4, when the simultaneous transmission of Ack/Nack and a CQI is set in each group. For example, a single cell capable of transmitting a PUCCH for each cell group may be a PCell in an MCG, and the single cell may be a special SCell (a special PCell or a sPCell or a PSCell) in an SCG.

For another example, setting may be performed not to allow a UE to perform simultaneous transmission of Ack/Nack and a CQI on a PUCCH in an SCG, under dual connectivity. In this instance, it may not need simultaneousAckNackAndCQI for an SCG (or SeNB) for the simultaneous transmission of Ack/Nack and a CQI on a PUCCH for the corresponding SCG. However, even in this instance, an operation of simultaneously transmitting Ack/Nack and a CQI on a PUCCH according to simultaneousAckNackAndCQI, should be applied only to an MCG or MeNB. Therefore, for a UE configuring dual connectivity, simultaneousAckNackAndCQI (e.g., a corresponding RRC parameter) may need to be indicated by being changed into simultaneousAckNackAndCQI for an MCG or simultaneousAckNackAndCQI for an MeNB. Alternatively, when the corresponding parameter is used as it is, a BS may provide an indication so that a UE configuring dual connectivity is configured to use simultaneousAckNackAndCQI, which is the existing RRC parameter, only for an MeNB or an MCG.

Method 3: a method of configuring simultaneousAckNackAndCQI-Format3-r11 independently for each cell group, wherein simultaneousAckNackAndCQI-Format3-r11 is an RRC parameter indicating the simultaneous transmission of Ack/Nack and a CQI through PUCCH format 3.

For example, in the same manner of configuring simultaneousAckNackAndCQI-Format3 for a master cell group and configuring simultaneousAckNackAndCQI-Format3 for a secondary cell group, an RRC parameter indicating the simultaneous transmission of Ack/Nack and a CQI may be configured for each cell group. Alternatively, in the same manner of configuring simultaneousAckNackAndCQI-Format3 for a master BS and configuring simultaneousAckNackAndCQI-Format3 for a secondary BS, an RRC parameter indicating simultaneous transmission of Ack/Nack and a CQI may be configured for each BS that forms each cell group.

That is, a PUCCH may be transmitted in a single cell for each cell group. Thus, it is the method of setting for multiplexing Ack/Nack and a CQI using the mechanism described with reference to Equations 1 to 4, when the simultaneous transmission of Ack/Nack and a CQI is set in each group. For example, a single cell capable of transmitting a PUCCH for each cell group may be a PCell in an MCG, and the single cell may be a special SCell (a special PCell or a sPCell or a PSCell) in an SCG.

For another example, setting may be performed not to allow a UE to perform the simultaneous transmission of Ack/Nack and a CQI on a PUCCH in an SCG, under dual connectivity. In this instance, it may not need simultaneousAckNackAndCQI-Format3 for an SCG (or SeNB) for the simultaneous transmission of Ack/Nack and a CQI on a PUCCH for the corresponding SCG. However, even in this instance, an operation of simultaneous transmission of Ack/Nack and a CQI on a PUCCH according to simultaneousAckNackAndCQI-Format3 should be applied only to an MCG or MeNB. Therefore, for a UE configuring dual connectivity, simultaneousAckNackAndCQI-Format3-r11 (e.g., a corresponding RRC parameter) may need to be indicated by being changed into simultaneousAckNackAndCQI-Format3 for an MCG or simultaneousAckNackAndCQI-Format3 for an MeNB. Alternatively, when the corresponding parameter is used as it is, a BS may provide an indication so that a UE configuring dual connectivity is configured to use simultaneousAckNackAndCQI, which is the existing RRC parameter, only for an MeNB or an MCG.

Method 4: a method of configuring simultaneousPUCCH-PUSCH independently for each cell group, wherein simultaneousPUCCH-PUSCH is an RRC parameter indicating the simultaneous transmission of a PUCCH and a PUSCH.

For example, in the same manner of configuring simultaneousPUCCH-PUSCH for a master cell group and configuring simultaneousPUCCH-PUSCH for a secondary cell group, an RRC parameter indicating the simultaneous transmission of a PUCCH and a PUSCH may be configured for each cell group. Alternatively, in the same manner of configuring simultaneousPUCCH-PUSCH for a master BS and configuring simultaneousPUCCH-PUSCH for a secondary BS, an RRC parameter indicating the simultaneous transmission of a PUCCH and a PUSCH may be configured for each BS that forms each cell group.

That is, a PUCCH is transmitted in a single cell of each cell group. Thus, this is the method of setting for multiplexing a PUCCH and a PUSCH using the mechanism described with reference to Equations 1 to 4 and setting a piggyback mechanism transmitting the UCI through a PUCCH piggybacks on a PUSCH to satisfy backward compatibility, when the simultaneous transmission of a PUCCH and a PUSCH is set in each group. For example, a single cell capable of transmitting a PUCCH for each cell group may be a PCell in an MCG, and the single cell may be a special SCell (a special PCell or a sPCell or a PSCell) in an SCG.

For another example, setting may be performed not to allow a UE to perform simultaneous transmission of a PUCCH and a PUSCH in an SCG, under dual connectivity. In this situation, it may not need simultaneousPUCCH-PUSCH for the corresponding SCG or SeNB. However, even in this instance, an operation of simultaneous transmission of a PUCCH and a PUSCH according to simultaneousPUCCH-PUSCH should be applied only to an MCG or an MeNB. Therefore, for a UE configuring dual connectivity, simultaneousPUCCH-PUSCH (e.g., a corresponding RRC parameter) may need to be indicated by being changed into simultaneousPUCCH-PUSCH for an MCG or simultaneousPUCCH-PUSCH for an MeNB. Alternatively, the corresponding parameter may be used as it is. In this instance, a BS may provide an indication so that a UE configuring dual connectivity is configured to use simultaneousPUCCH-PUSCH, which is the existing RRC parameter, only for an MeNB or an MCG.

A method for a UE to multiplex uplink channels or multiplex an uplink channel and an uplink signal using an RRC parameter, which is independent for each cell group, has been described with illustration.

Hereinafter, when different cell groups are configured for a UE, when dual connectivity is configured for a UE, or when multiple PUCCHs are configured for a UE, transmission power controlling with respect to an uplink channel and an uplink signal will be described.

For example, a UE may set uplink maximum transmission power for each cell group. That is, the UE may set $P\_cmax,MCG$ for a master cell group as uplink maximum transmission power, and the UE may set $P\_cmax,SCG$ for a secondary cell group as the uplink maximum transmission power. $P\_cmax,MCG$ and $P\_cmax,SCG$ may satisfy one of the following conditions.

$$P_{CMAX} \geq P_{CMAX,MCG}, P_{CMAX} \geq P_{CMAX,SCG},$$
$$P_{CMAX} \geq P_{CMAX,MCG} + P_{CMAX,SCG} \qquad 1)$$

$$P\_cmax \geq P\_cmax, MCG, P\_cmax \geq P\_cmax, SCG,$$
$$P\_cmax \leq P\_cmax, MCG + P\_cmax, SCG \qquad 2)$$

The present disclosure may be applied to each of the conditions 1) and 2), and for ease of description, condition 1) will be described. As a matter of course, the present disclosure may be applied to condition 2), in a similar manner.

As described above, a UE in the present disclosure may determine the uplink transmission power independently for each cell group, based on the uplink maximum transmission power set for each cell group. That is, the UE may apply P_cmax,MCG instead of P_cmax, with respect to the transmission of a PUCCH/PUSCH/PRACH and an SRS of serving cells included in an MCG. The UE may apply P_cmax,SCG instead of P_cmax, with respect to the transmission of a PUCCH/PUSCH/PRACH and an SRS of serving cells included in an SCG.

For example, the transmission power of an uplink channel and an uplink signal may be determined based on the uplink maximum transmission power of each cell group. For reference, in association with the transmission power of an uplink channel and an uplink signal, $P_{CMAX}$ is changed to $P_{CMAX,CG}$, and $P_{CMAX,CG}$ is applied in the conventional section 5.1.1.1 in TS 36.213, as shown in the following table.

| Proposed Modification of section 5.1.1.1 in TS 36.213 v11.5.0 |
| --- |
| If the UE is configured with multiple TAGs, and if the PUCCH/PUSCH transmission of the UE on subframe i for a given serving cell in a TAG overlaps some portion of the first symbol of the PUSCH transmission on subframe i + 1 for a different serving cell in another TAG the UE shall adjust its total transmission power to not exceed $P_{CMAX,CG}$ on any overlapped portion. If the UE is configured with multiple TAGs, and if the PUSCH transmission of the UE on subframe i for a given serving cell in a TAG overlaps some portion of the first symbol of the PUCCH transmission on subframe i + 1 for a different serving cell in another TAG the UE shall adjust its total transmission power to not exceed $P_{CMAX,CG}$ on any overlapped portion. If the UE is configured with multiple TAGs, and if the SRS transmission of the UE in a symbol on subframe i for a given serving cell in a TAG overlaps with the PUCCH/PUSCH transmission on subframe i or subframe i + 1 for a different serving cell in the same or another TAG the UE shall drop SRS if its total transmission power exceeds $P_{CMAX,CG}$ on any overlapped portion of the symbol. If the UE is configured with multiple TAGs and more than 2 serving cells, and if the SRS transmission of the UE in a symbol on subframe i for a given serving cell overlaps with the SRS transmission on subframe i for a different serving cell(s) and with PUSCH/PUCCH transmission on subframe i or subframe i + 1 for another serving cell(s) the UE shall drop the SRS transmissions if the total transmission power exceeds $P_{CMAX,CG}$ on any overlapped portion of the symbol. If the UE is configured with multiple TAGs, the UE shall, when requested by higher layers, to transmit PRACH in a secondary serving cell in parallel with SRS transmission in a symbol on a subframe of a different serving cell belonging to a different TAG, drop SRS if the total transmission power exceeds $P_{CMAX,CG}$ on any overlapped portion in the symbol. If the UE is configured with multiple TAGs, the UE shall, when requested by higher layers, to transmit PRACH in a secondary serving cell in parallel with PUSCH/PUCCH in a different serving cell belonging to a different TAG, adjust the transmission power of PUSCH/PUCCH so that its total transmission power does not exceed $P_{CMAX,CG}$ on the overlapped portion. where, $P_{CMAX,CG}$ is P_cmax,CG for each cell group and CG is one of [MCG, SCG]. |

When determining P_cmax,CG of each cell group with respect to uplink channels (e.g. PUCCH/PUSCH/PRACH) and a signal (e.g. SRS) in a UE configured with different cell groups, a UE configured with dual connectivity, or a UE configured with multiple PUCCHs it may be required to maintain backward compatibility in controlling transmission power respect to each uplink channel, channels, and a combination thereof. Also, in order to use a power scaling mechanism associated with power controlling used for carrier aggregation performed by a single BS, power scaling is performed in an identical cell group preferentially, and power scaling may be executed when a total sum of transmission power of uplink channels (e.g. PUCCH/PUSCH/PRACH) and signals (e.g. SRS) transmitted in different cell groups exceeds maximum power P_cmax that the UE may use for transmission.

FIG. 11 to FIG. 21 are diagrams illustrating each embodiment associated with a method of a UE for transmitting an uplink signal or channel, according to the present disclosure.

With reference to FIG. 11 to FIG. 21, as an embodiment of the present disclosure, a method for performing power scaling when a total sum of the transmission power of the uplink channels (e.g. PUCCH/PUSCH/PRACH) and signals (e.g. SRS) transmitted in different cell groups exceeds P_cmax, which is the maximum transmission power that a UE may use for transmission will be described.

For example, in order to enable a UE configured with different cell groups to execute power controlling or multiplexing in association with the transmission of multiple PUCCH(s)/PUSCH/SRS, which are transmitted in different cell groups, (that is, uplink channels/signal combination), the following method may be applied.

When the method is applied, the following additional UE operations may be required with respect to a combination of uplink channels and signals, which is transmitted in each of an MCG and an SCG.

Figure 11:
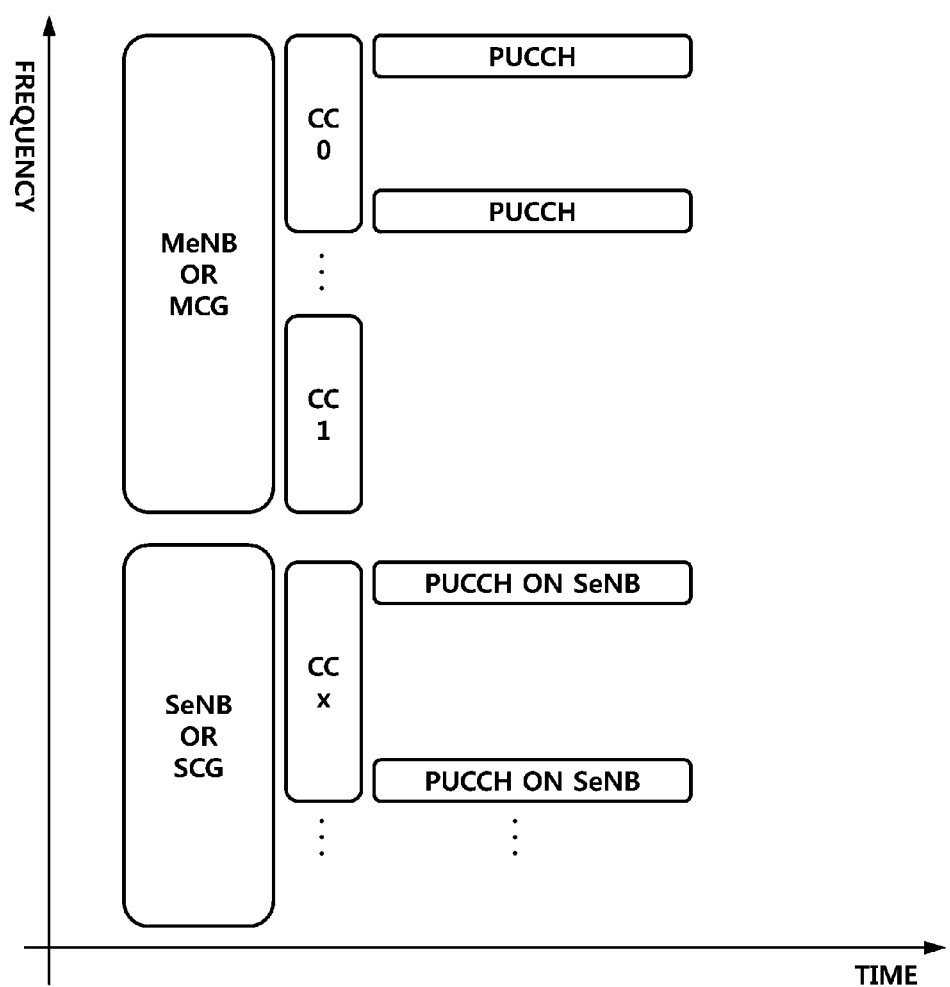
FIG. 11 to FIG. 21 are diagrams for describing a method of a User Equipment (UE) for transmitting an uplink channel and an uplink signal, or a channel, according to at least one embodiment of the present disclosure.

When a PUCCH is simultaneously transmitted in different cell groups, and the total sum of transmission power exceeds the maximum transmission power Pcmax that a UE may use for transmission As shown in FIG. 11, if the UE is configured with [multiple PUCCH configuration or transmission] or [dual connectivity capability], and if the PUCCH transmission of the UE on subframe i for a given serving cell on Master Cell Group (MCG) overlaps some portion of the PUCCH transmission on subframe i+1 for a different serving cell on Secondary Cell Group (SCG), the UE shall adjust its total transmission power to not exceed $P_{CMAX}$ on any overlapped portion.

Figure 12:
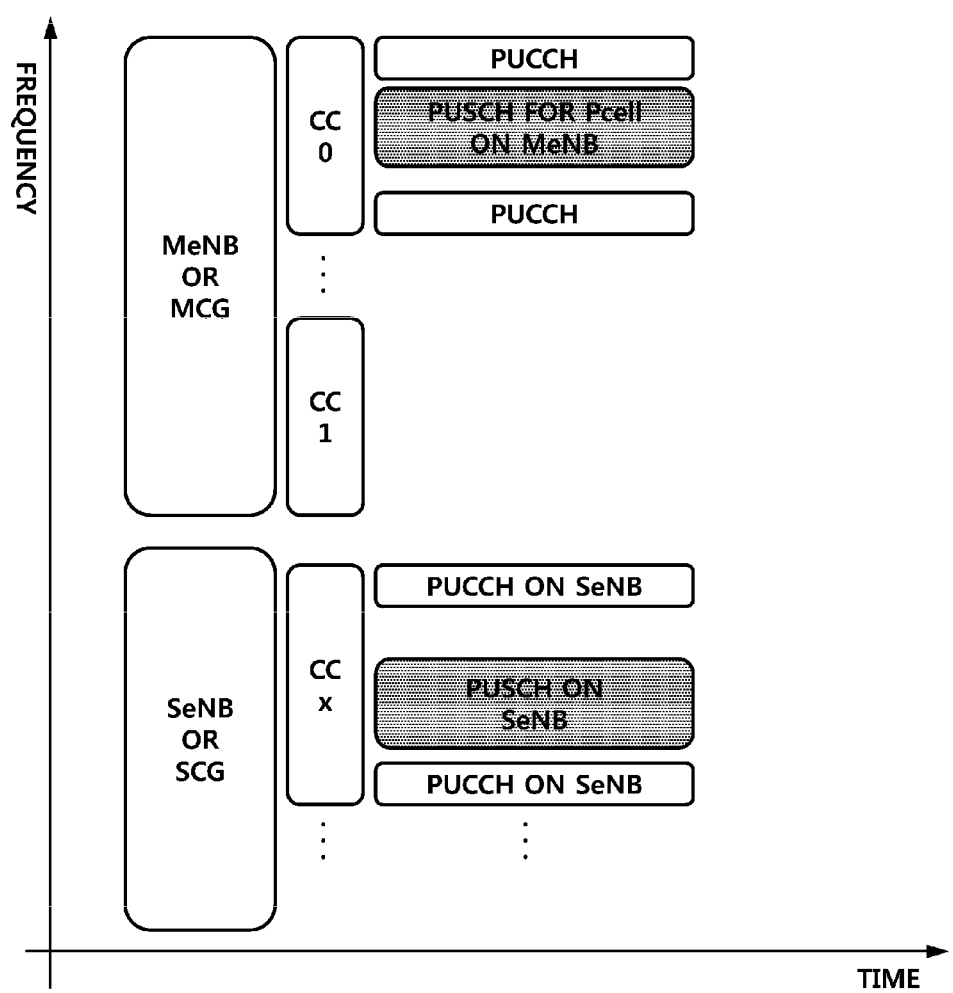

When a PUCCH/PUSCH is simultaneously transmitted in different cell groups, and the total sum of transmission power exceeds the maximum transmission power Pcmax that a UE may use for transmission As shown in FIG. 12, if the UE is configured with [multiple PUCCH configuration or transmission] or [dual connectivity capability], and if the PUCCH/PUSCH transmission of the UE on subframe i for a given serving cell on Master Cell Group (MCG) overlaps some portion of the PUCCH/PUSCH transmission on subframe i+1 for a different serving cell on Secondary Cell Group (SCG), the UE shall adjust its total transmission power to not exceed $P_{CMAX}$ on any overlapped portion.

Figure 13:
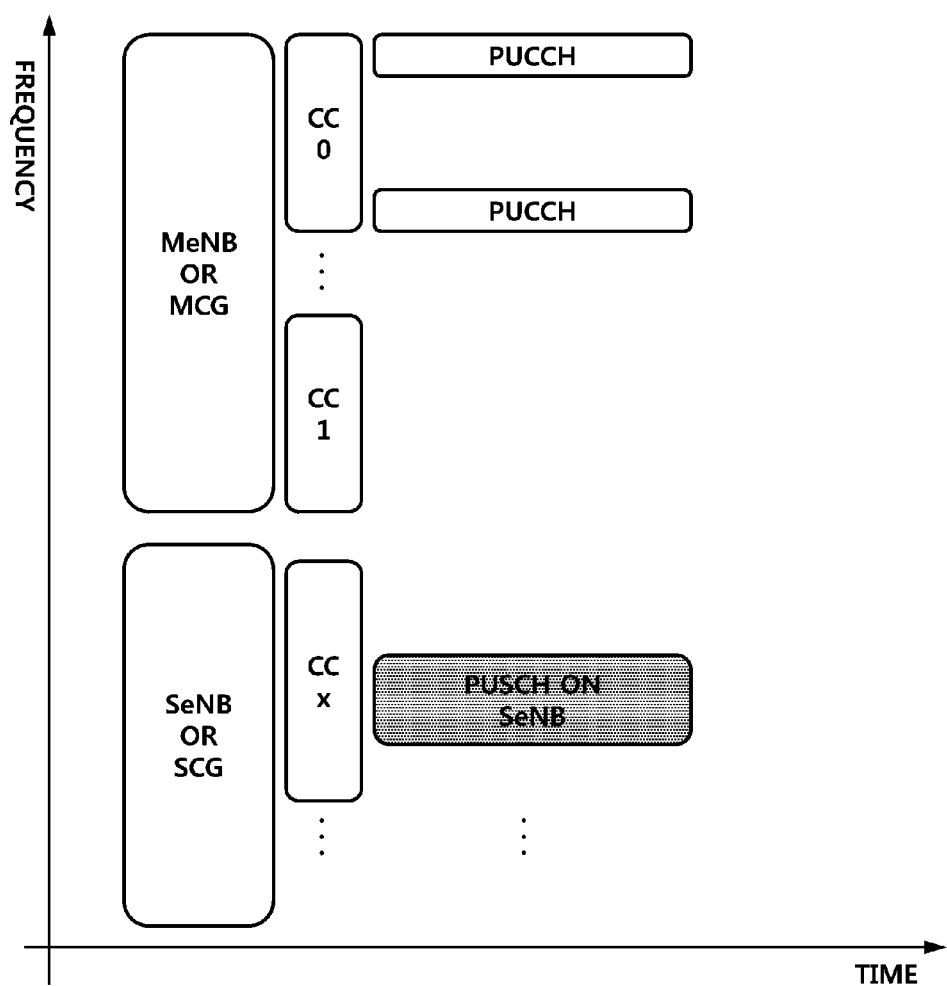

When the PUCCH transmission on an MCG (PUCCH on MCG) and the PUSCH transmission on an SCG (PUSCH on SCG) are simultaneously executed under different cell groups, and the total sum of transmission power exceeds the maximum transmission power Pcmax that a UE may use for transmission As illustrated in FIG. 13, if the UE is configured with [multiple PUCCH configuration or transmission] or [dual connectivity capability], and if the PUCCH transmission of the UE on subframe i for a given serving cell on Master Cell Group (MCG) overlaps some portion of the first symbol of the PUSCH transmission on subframe i+1 for a different serving cell on Secondary Cell Group (SCG), the UE shall adjust its total transmission power to not exceed $P_{CMAX}$ on any overlapped portion.

Figure 14:
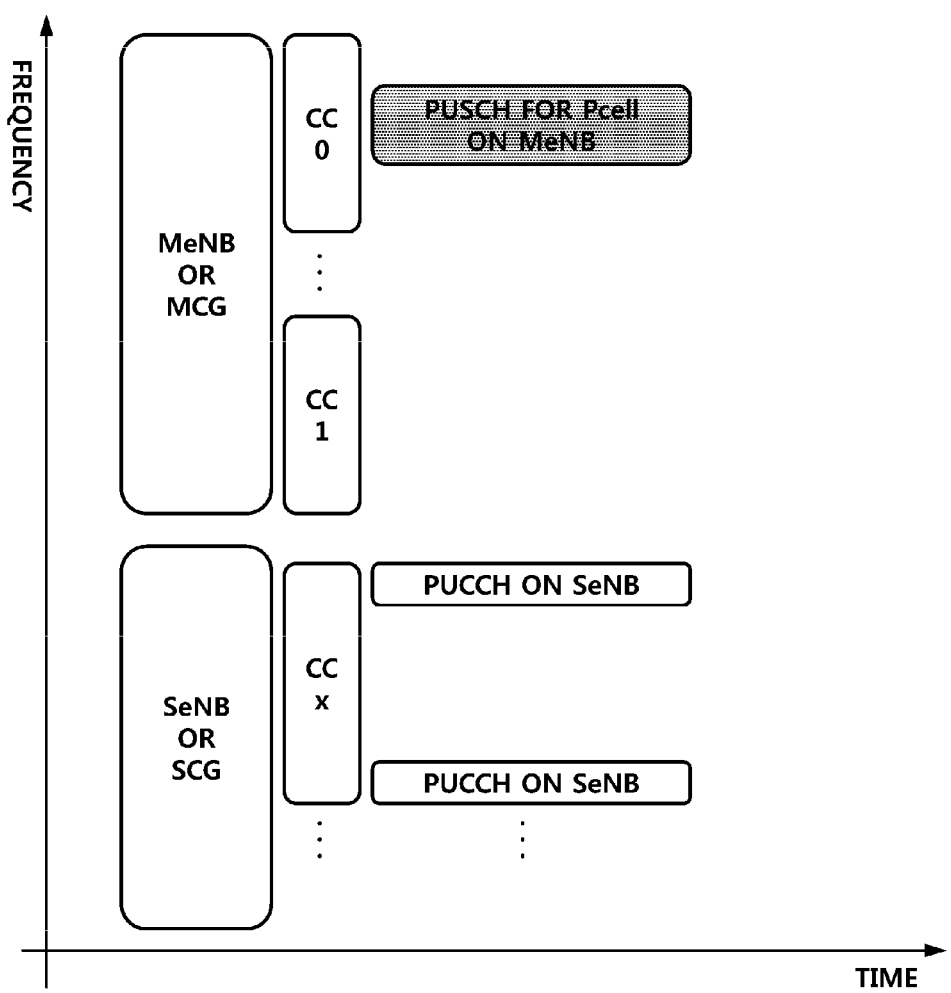

When the PUSCH transmission on an MCG (PUSCH on MCG) and the PUCCH transmission on an SCG (PUCCH on SCG) are simultaneously executed under different cell groups, and the total sum of transmission power exceeds the maximum transmission power Pcmax that a UE may use for transmission As illustrated in FIG. 14, if the UE is configured with [multiple PUCCH configuration or transmission] or [dual connectivity capability], and if the PUSCH transmission of the UE on subframe i for a given serving cell on Master Cell Group (MCG) overlaps some portion of the first symbol of the PUCCH transmission on subframe i+1 for a different serving cell on Secondary Cell Group (SCG), the UE shall adjust its total transmission power to not exceed $P_{CMAX}$ on any overlapped portion.

Figure 15:
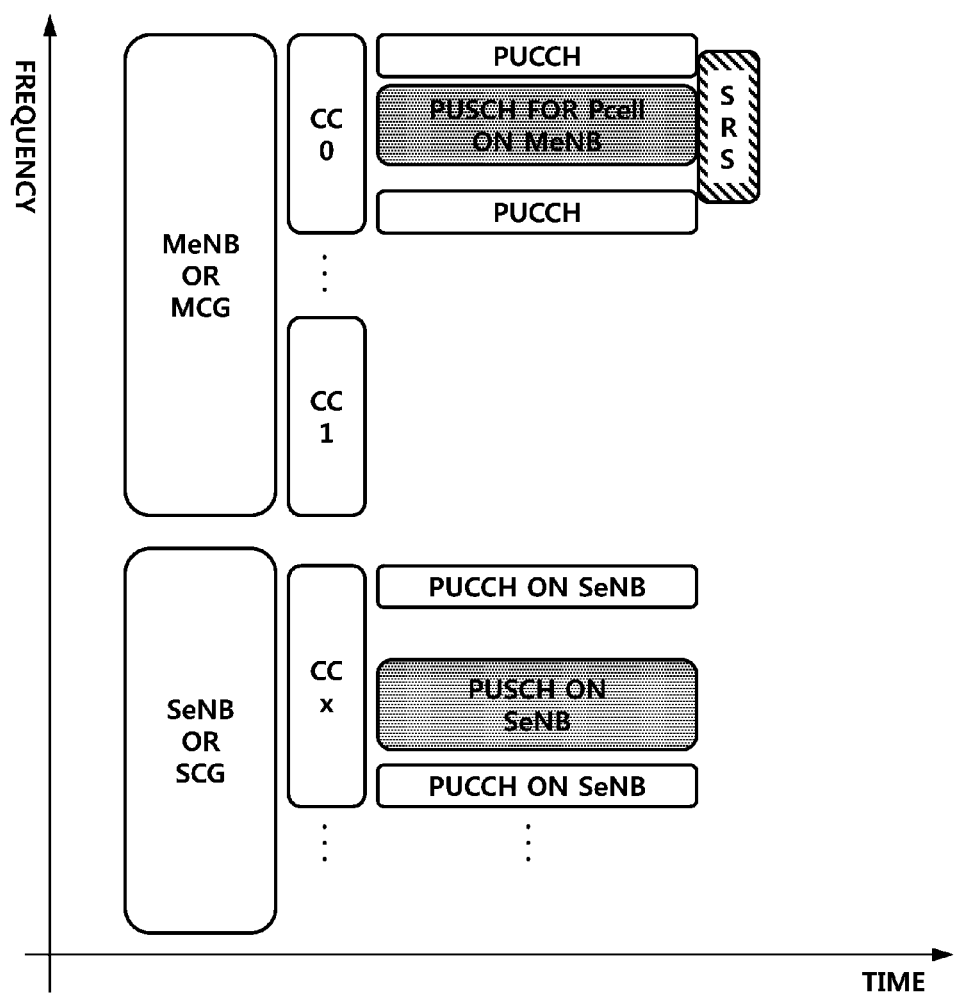
Figure 16:
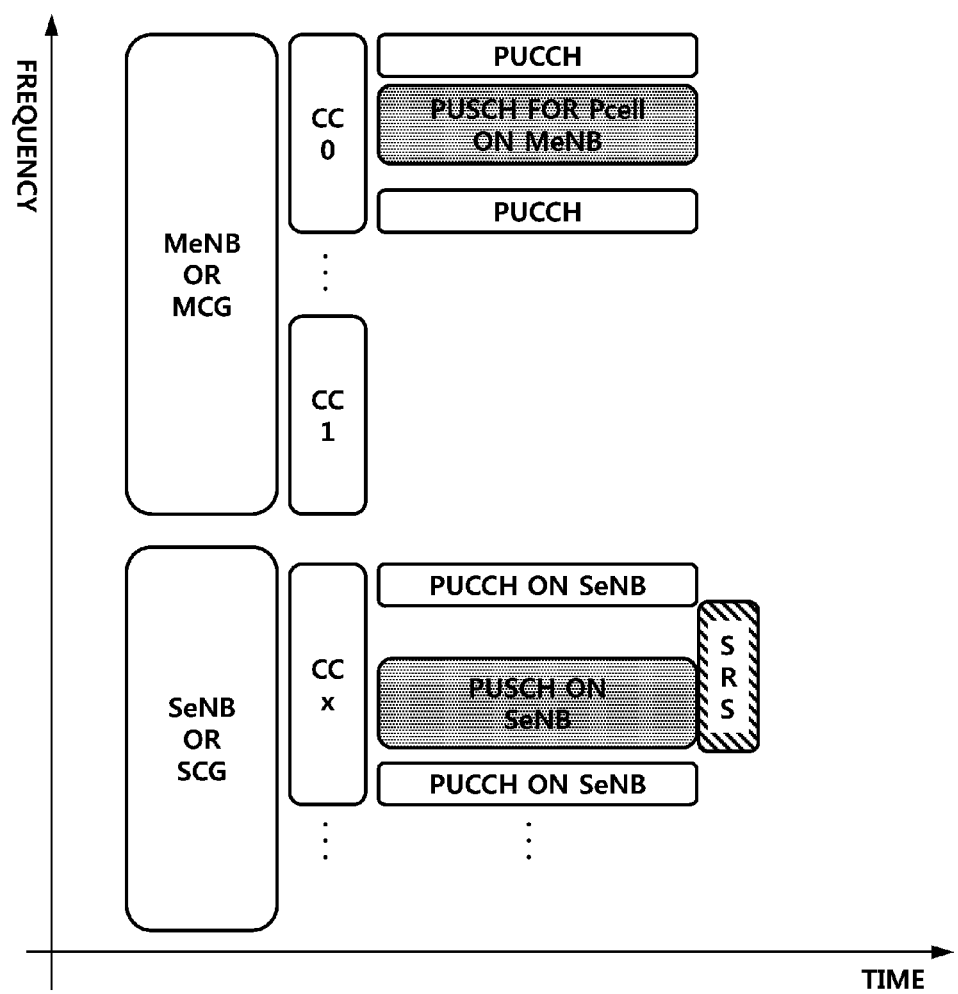

When the SRS transmission on an MCG (SRS on MCG) and the PUCCH/PUSCH transmission on an SCG (PUCCH/PUSCH on SCG) are simultaneously executed under different cell groups, and the total sum of transmission power exceeds the maximum transmission power Pcmax that a UE may use for transmission FIG. 15 illustrates transmission of SRS in an MCG, and FIG. 16 illustrates transmission of an SRS in an SCG.

As illustrated in FIGS. 15 and 16, if the UE is configured with [multiple PUCCH configuration or transmission] or [dual connectivity capability], and if the SRS transmission of the UE in a symbol on subframe i for a given serving cell on a Cell Group (CG) overlaps with the PUCCH/PUSCH transmission on subframe i or subframe i+1 for a different serving cell on another Cell Group (CG), the UE shall drop SRS if its total transmission power exceeds $P_{CMAX}$ on any overlapped portion of the symbol.

Figure 17:
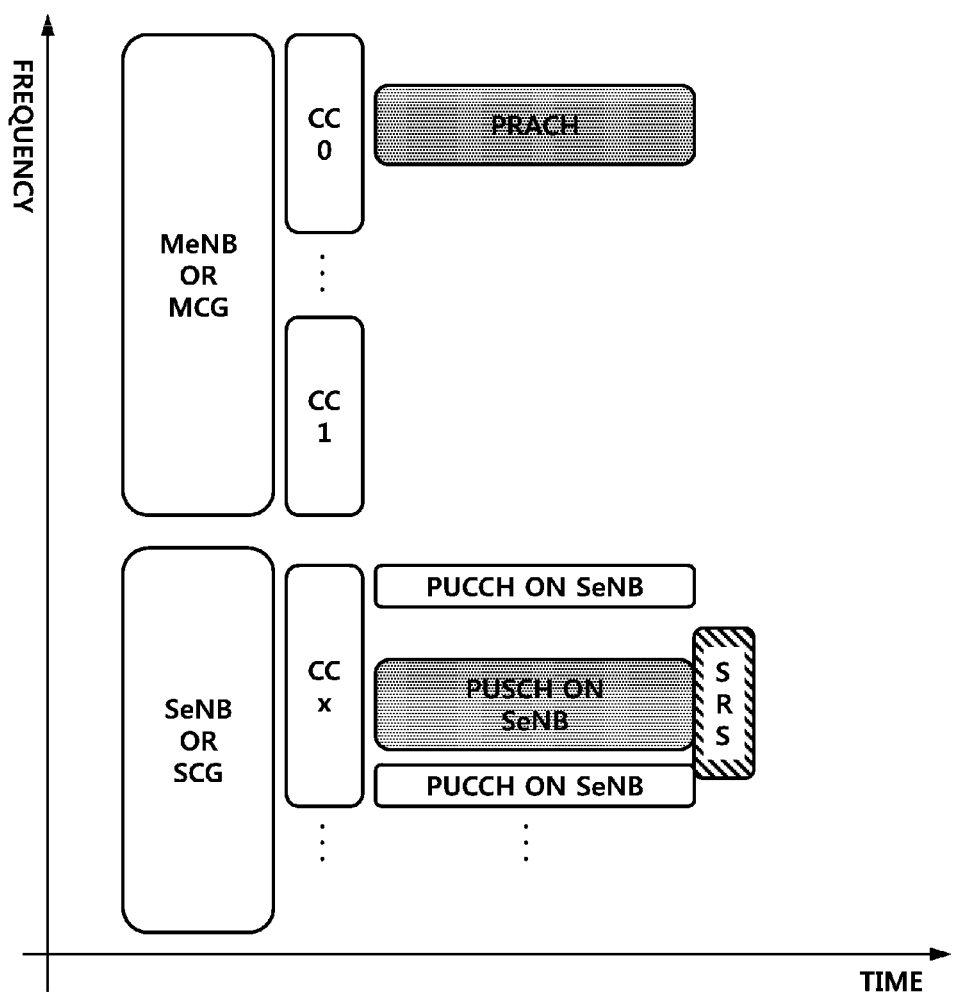
Figure 18:
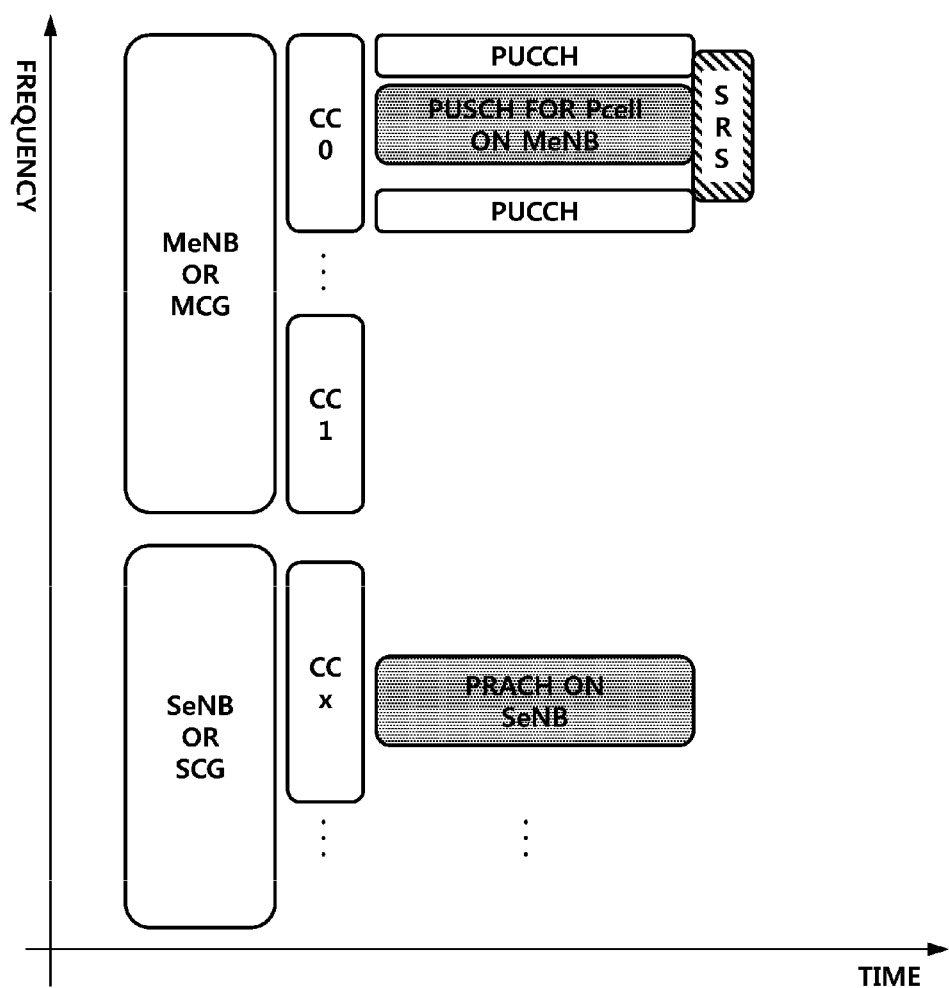

When the PRACH transmission in one or more cells in a cell group and the SRS transmission in a cell included in another cell group are simultaneously executed under different cell groups, and the total sum of transmission power exceeds the maximum transmission power Pcmax that a UE may use for transmission FIG. 17 illustrates transmission of a PRACH in an MCG, and transmission of an SRS in an SCG, and FIG. 18 illustrates transmission of a PRACH in an SCG and an transmission of a SRS in an MCG.

As illustrated in FIG. 17 and FIG. 18, if the UE is configured with [multiple PUCCH configuration or transmission] or [dual connectivity capability], the UE shall, when requested by higher layers, transmit PRACH in more than one serving cell on a Cell Group in parallel with SRS transmission in a symbol on a subframe of more than a different serving cell belonging to a different Cell Group, drop SRS if the total transmission power exceeds $P_{CMAX}$ on any overlapped portion in the symbol.

When the PRACH transmission in one or more cells in a cell group and the PUSCH/PUCCH transmission in a cell(s) included in another cell group are simultaneously executed under different cell groups, and the total sum of the transmission power exceeds the total transmission power Pcmax that a UE may use for transmission As illustrated in FIGS. 17 and 18, if the UE is configured with [multiple PUCCH configuration or transmission] or [dual connectivity capability], the UE shall, when requested by higher layers, transmit PRACH in more than a serving cell on a Cell Group in parallel with PUSCH/PUCCH in more than one different serving cell belonging to a different Cell Group, adjust the transmission power of PUSCH/PUCCH so that its total transmission power does not exceed $P_{CMAX}$ on the overlapped portion.

Figure 19:
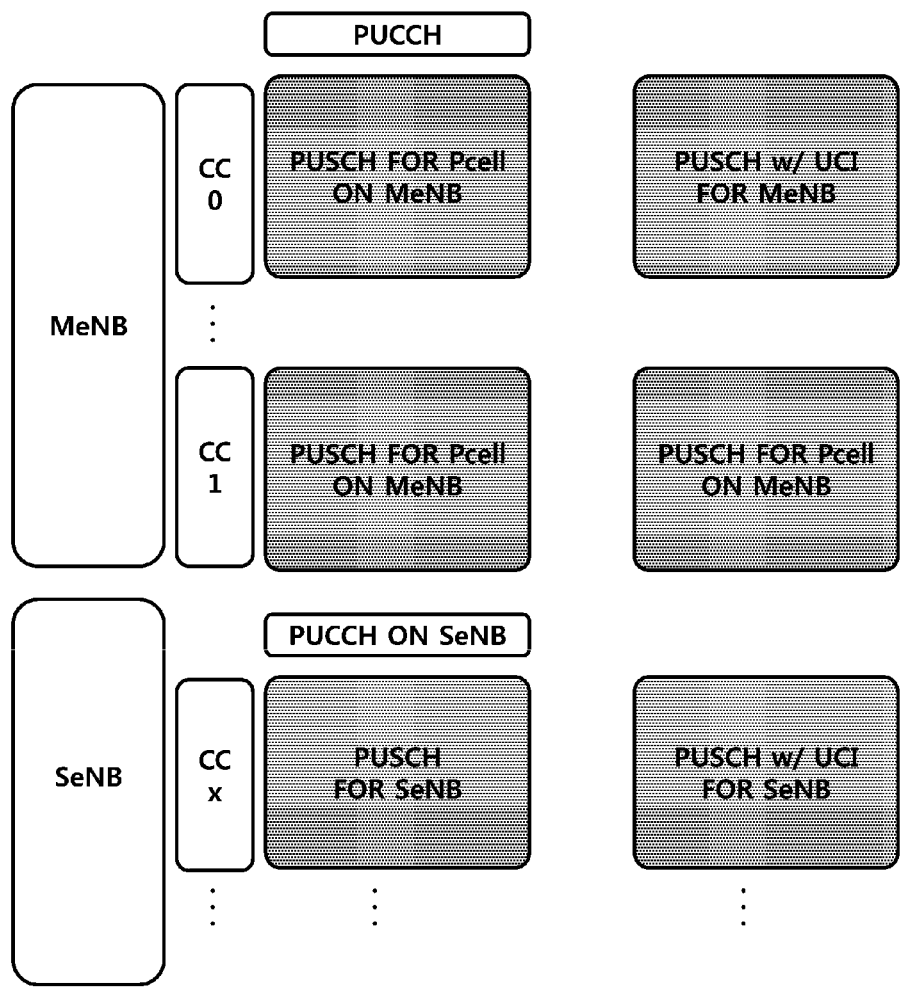
Figure 20:
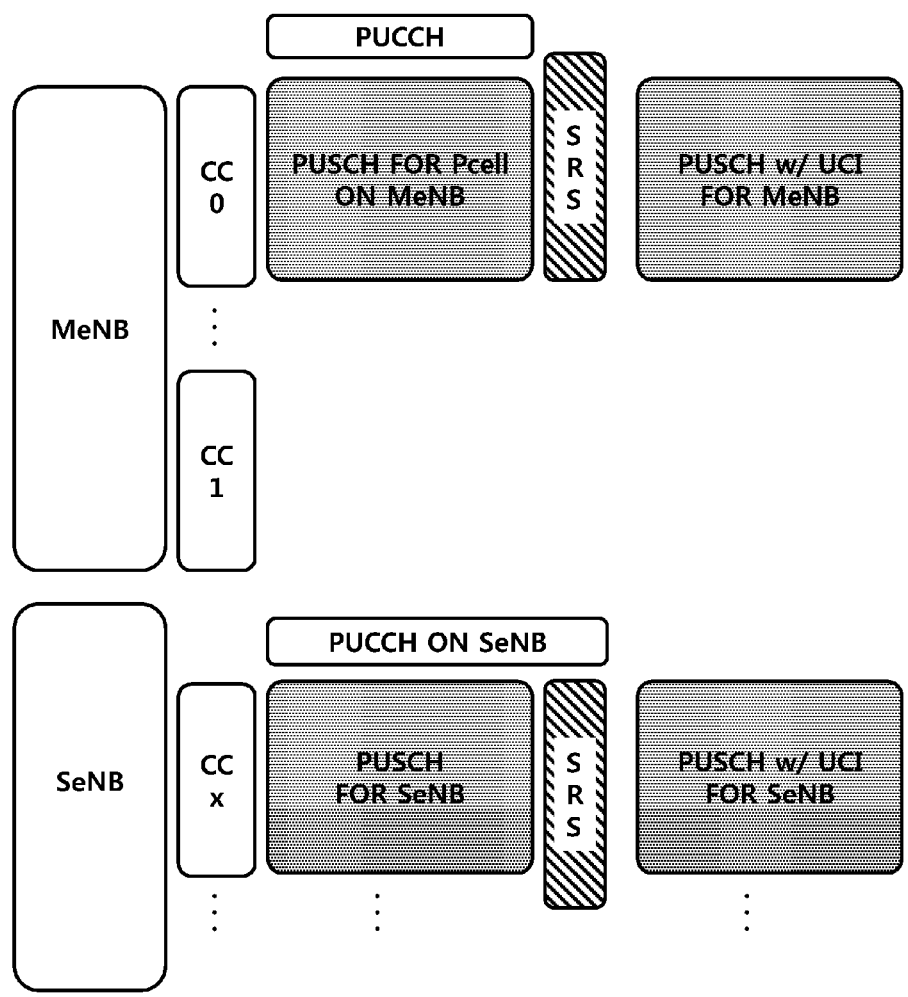
Figure 21:
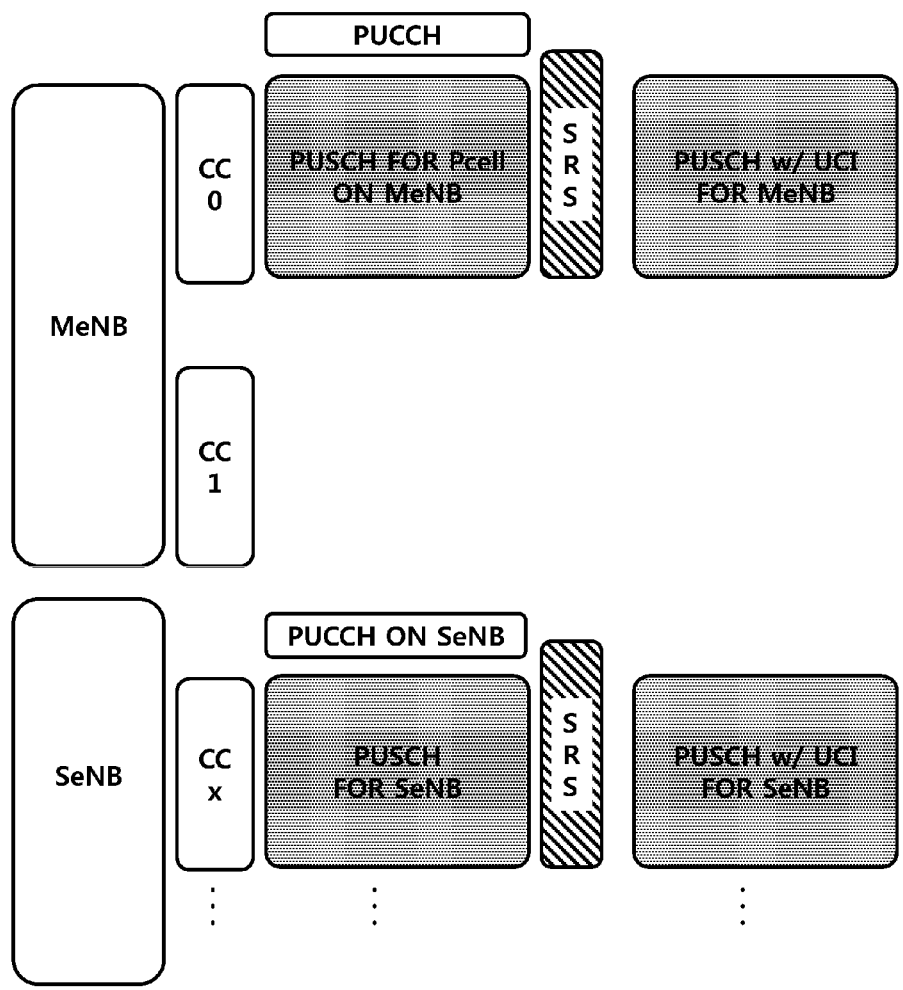

In the dual connectivity situation, as illustrated in FIG. 19 to FIG. 21, a UE may transmit a PUCCH, a PUSCH, and an SRS in different cell groups. Here, the power transmission allocating method of the present disclosure, which has been described with reference to FIG. 11 to FIG. 18, may be applied.

Referring to FIG. 19, a PUCCH is transmitted in a single cell in an MCG, and a PUCCH may be transmitted in a single cell in an SCG. Also, a PUSCH may be transmitted in each serving cell that configures the MCG and the SCG. Here, a few PUSCHs may not include UCI.

Referring to FIG. 20, a PUCCH is transmitted in a single cell in an MCG, and a PUCCH may be transmitted in a single cell in an SCG. Also, an SRS and a PUSCH may be transmitted in a serving cell of each cell group through which a PUCCH is transmitted, and a few PUSCHs may not include UCI. Here, the SRS in the MCG may overlap the PUCCH in the SCG.

Referring to FIG. 21, a PUCCH is transmitted in a single cell in an MCG, and a PUCCH may be transmitted in a single cell in an SCG. Also, an SRS and a PUSCH may be transmitted in a serving cell of each cell group through which a PUCCH is transmitted, and a few PUSCHs may not include UCI. Here, the SRS in the MCG and the PUCCH in the SCG may not overlap.

A relationship with the total maximum transmission power of a UE that simultaneously transmits an uplink channel and an uplink signal has been described in detail according to each scenario of synchronization transmission of an uplink channel and an uplink signal.

Hereinafter, a method of allocating transmission power to each of an uplink channel and an uplink signal, for the transmission of an uplink channel and an uplink signal under dual connectivity according to the present disclosure, will be described. For example, the present disclosure relates to a method and apparatus for performing multiplexing and for transmission power controlling, in order to perform transmission power controlling under the limited amount of maximum transmission power of a UE, in association with the transmission of each or a combination of an uplink PUCCH/PUSCH/SRS, which is transmitted from the UE to different BSs, when the transmission of each or a combination of a PUCCH/PUSCH/SRS with respect to different BSs or different cell groups is considered under dual connectivity.

When PUCCH or PUSCH transmission in each cell group is considered, a BS may define transmission power that may be secured, and sets or signals the same with respect to a UE configured with dual connectivity.

For example, an MeNB may define transmission power (for example, P_MeNB) that may be secured when a UE considers PUCCH or PUSCH transmission in a cell group associated with the MeNB, and the MeNB may set the information or executes signaling the same to the UE.

For another example, the MeNB may define transmission power (for example, P_SeNB) that may be secured when the UE considers PUCCH or PUSCH transmission, for a cell group associated with another BS, and may set the information or executes signaling the same to the UE.

For another example, when the MeNB or a master cell group defines P_SeNB, and set or signal the same, transmission to each BS may be executed by securing the transmission power for a part of at least PUCCH or PUSCH transmission of the transmission to each BS or cell group.

The present disclosure provides a method and an operation of a UE for controlling transmission power of an uplink channel and an uplink signal when the total maximum transmission power of the UE is P_cmax and P_MeNB and P_SeNB is set in the UE. Herein, the uplink channel and the uplink signal may be allocated when transmission of each or a combination of a PUCCH, a PUSCH, or when an SRS is executed with respect to different BSs.

Figure 22:
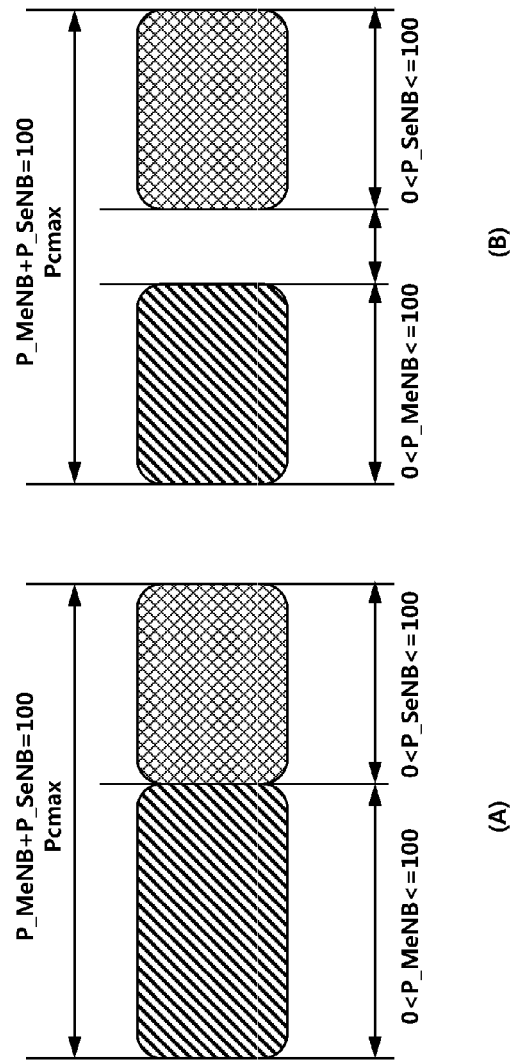
FIG. 22 is a diagram exemplary illustrating determining uplink maximum transmission power of each cell group in accordance with at least one of the present disclosure.

FIG. 22 is a diagram exemplary illustrating determining uplink maximum transmission power of each cell group in accordance with at least one embodiment of the present disclosure.

Referring to FIG. 22, under the assumption that a sum of P_MeNB and P_SeNB does not exceed 100% of Pcmax, two cases, such as the cases (a) and (b) of FIG. 22, may be considered. That is, the case (a) is a case in which the sum of P_MeNB+PSeNB is set to Pcmax, and the case (b) is a case in which the sum of P_MeNB+PSeNB is set to be smaller than Pcmax.

Figure 23:
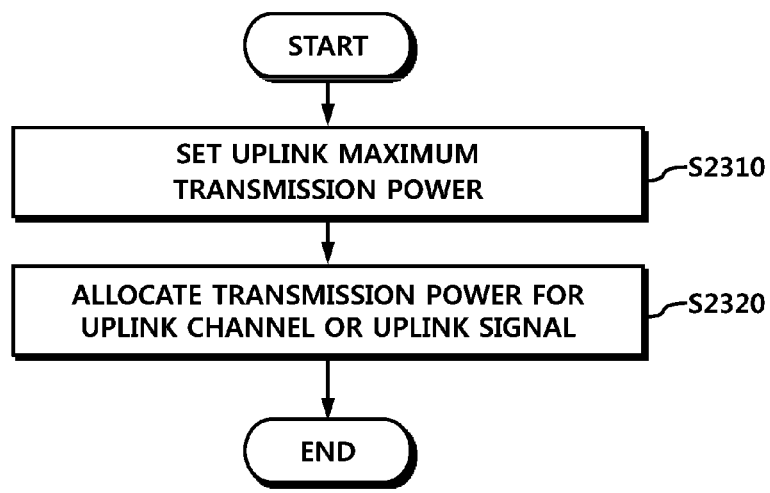
FIG. 23 is a diagram exemplary illustrating operations of a UE according to an embodiment of the present disclosure.

FIG. 23 is a diagram illustrating operations of a UE according to an embodiment of the present disclosure.

According to an embodiment of the present disclosure, a method of a UE for controlling uplink transmission power, the method includes: setting uplink maximum transmission power for each of a plurality of cell groups including one or more serving cells, and allocating transmission power for an uplink channel and an uplink signal, based on at least one of the uplink maximum transmission power, a total sum of the transmission power of one or more uplink channels and an uplink signal transmitted in each of the plurality of cell groups, and total maximum transmission power of the UE. Here, the uplink channel may include a Physical Uplink Control Channel (PUCCH) or a Physical Uplink Shared Channel (PUSCH), and the uplink signal may include a Sounding Reference Signal (SRS).

Referring to FIG. 23, in accordance with at least one embodiment of the present disclosure, a method of a UE includes setting uplink maximum transmission power for each of a plurality of cell groups including one or more serving cells in operation S2310. For example, uplink maximum transmission power for each of the plurality of cell groups may be set, from a BS, in a UE configured with dual connectivity. The uplink maximum transmission power may be set independently for each cell group, and the UE may set the uplink maximum transmission power by receiving information for setting the uplink maximum transmission power from an MeNB. Also, a total sum of the uplink maximum transmission power of each of the plurality of cell groups may be set to be less than or equal to the total maximum transmission power of the UE. That is, the uplink maximum transmission power of each of the plurality of cell groups may be set as described in the case (a) of FIG. 22. Alternatively, the uplink maximum transmission power of each of the plurality of cell groups may be set as described in the case (b) of FIG. 22.

The method of the UE may include allocating transmission power for an uplink channel and an uplink signal, based on at least one of the uplink maximum transmission power, a total sum of the transmission power of one or more uplink channels and uplink signals, transmitted in each of the plurality of cell groups, and the total maximum transmission power of the UE in operation S2320. For example, the UE may allocate transmission power with respect to each uplink channel and each uplink signal, for transmitting an uplink channel and an uplink signal. To this end, the UE may allocate the transmission power of an uplink channel and an uplink signal, based on at least one piece of information from among uplink maximum transmission power set for a corresponding cell group, the total maximum transmission power of the UE (Pcmax) and a total sum of the transmission power of an uplink channel and an uplink signal to be transmitted, in operation S2310.

For example, when a total sum of transmission power of an uplink channel and an uplink signal in each of the plurality of cell groups is within the uplink maximum transmission power, the transmission power of an SRS may be allocated independently for each of the plurality of cell groups. Particularly, when a total sum of transmission power of an uplink channel and an uplink signal to be transmitted to a BS configured with a corresponding cell group is less than or equal to uplink maximum transmission power set for the corresponding cell group, the UE may secure and allocate the SRS transmission power included in the uplink channel and the uplink signal.

For another example, when a total sum of transmission power of an uplink channel and an uplink signal in a cell group, out of the plurality of cell groups, exceeds the uplink maximum transmission power of the corresponding cell group, transmission power of a PUCCH and a PUSCH may be allocated preferentially rather than the transmission power of an SRS. Particularly, the UE may allocate the transmission power for an uplink channel and an uplink signal, independently for each of the plurality of cell groups. However, when the transmission power allocation with respect to an uplink channel and an uplink signal, which exceeds the uplink maximum transmission power, is required, the UE may preferentially allocate the transmission power of a PUCCH and a PUSCH rather than the transmission power of an SRS. For example, the UE may preferentially allocate the transmission power of a PUCCH and a PUSCH in a corresponding cell group, and may execute scaling down the transmission power of an SRS with respect to the remaining uplink transmission power and transmit the same, or may drop the transmission of the SRS.

For another example, the UE may preferentially allocate the transmission power of a PUCCH and a PUSCH in one out of the plurality of cell groups rather than the transmission power of an SRS of another cell group. Particularly, the UE may transmit an uplink channel and an uplink signal, in each of the plurality of cell groups. In this instance, the UE preferentially allocates the transmission power of the PUCCH and the PUSCH in each cell group. That is, when a power of a UE is restricted since a sum of the transmission power of an uplink channel and an uplink signal to be transmitted to a plurality of BSs exceeds the total maximum transmission power, transmission power of a PUCCH and a PUSCH of each cell group may be preferentially allocated rather than the transmission power of an SRS of another cell group. The total maximum transmission power denotes the maximum transmission power that a UE may use for transmission. For example, the transmission power of a PUCCH and a PUSCH in an MCG may be preferentially allocated rather than the transmission power of an SRS in an SCG. In the same manner, the transmission power of a PUCCH and a PUSCH in an SCG may be preferentially allocated rather than the transmission power of an SRS in an MCG.

As another example, a UE may preferentially allocate the transmission power of an SRS of a cell group associated with a BS that acts as a mobility anchor out of the plurality of cell groups, rather than the transmission power of an SRS of another cell group. As described above, a BS that acts as a mobility anchor with respect to a core network may exist in the dual connectivity situation. In the above descriptions, the BS is referred to as an MeNB. Therefore, under the above described UE power-restricted situation, the UE may preferentially allocate the transmission power of an SRS in an MCG associated with the MeNB rather than the transmission power of an SRS in an SCG.

As described above, the UE may allocate transmission power with respect to an uplink channel and an uplink signal. That is, under the UE power-restricted situation where a total sum of required transmission power of an uplink channel and an uplink signal exceeds the total maximum transmission power of the UE, each uplink channel and an uplink signal may be allocated based on priority. Each above described embodiment may be applied independently, or may be applied in combination. In the case of the combination, for example, according to the priority of transmission power allocation of an uplink channel and an uplink signal, a PUCCH and a PUSCH are prioritized over an SRS, and an SRS in an MCG is prioritized over an SRS in an SCG.

Hereinafter, a method of allocating transmission power of an uplink channel and an uplink signal according to each condition, such as a UE power-restricted situation or the like, will be described in detail.

A UE may differently control the transmission power of an SRS in the cases (a) and (b) of FIG. 22. Therefore, the present disclosure describes a method and apparatus for controlling the transmission power of an SRS for each embodiment, so that the method and apparatus may be applied to a corresponding condition.

In association with a "required transmission power value, which is required for the transmission of a PUCCH/PUSCH," a case in which one or both of the PUCCH/PUSCH do not exist at a predetermined point in time is included.

When setting the transmission power with respect to different cell groups, the additional allocation of remaining power with respect to each cell group may be considered in addition to the above described P_MeNB and P_SeNB. In particular, transmission power is allocated before transmission, based on a PUCCH or a PUSCH that is to actually be transmitted in different cell groups. In consideration of the above, a predetermined subframe of a predetermined cell group where one or both of a PUCCH and a PUSCH are not transmitted, may exist. Therefore, the remaining power may exist in both cases (a) and (b) of FIG. 22, and when Pcmax is the total maximum transmission power of a UE, the remaining power may exist.

For example, the allocation of the remaining power may be changed based on whether a BS is capable of recognizing scheduling information associated with another BS, whether a timing of a UE to perform transmission to different BSs is a synchronous state or an asynchronous state, or whether a look-ahead is to be supported, so that transmission to different BSs is recognized in advance. Particularly, transmission power may be allocated with respect to at least a PUCCH or a PUSCH, based on a priority. The priority may be determined to enable transmission power with respect to different cell groups to be finally allocated based on a synchronization state of UE (synch/asynch), whether look-ahead is to be supported, or whether a timing difference between transmissions executed by a UE to two BSs is less than or greater than or equal to a predetermined value; for example, [33 us]. Herein, the predetermined value is a value that assumes that the transmissions from the UE to the two BSs are synchronized. By taking into consideration the above conditions, hereinafter, a method of operating the UE under the case (a) and the case (b) of FIG. 22 will be described through examples.

1. When the required power for transmission of a PUCCH/PUSCH/SRS in an MeNB or an MCG is less than or equal to P_MeNB, and when the required power for transmission of a PUCCH/PUSCH/SRS in an SeNB or an SCG is less than or equal to P_SeNB (Required Power for PUCCH/PUSCH/SRS transmission on MeNB<=P_MeNB and Required Power for PUCCH/PUSCH/SRS transmission on SeNB<=PSeNB)

When a sum of a required transmission power value for transmission of a PUCCH/PUSCH and when a required transmission power value for the transmission of an SRS in each cell group does not exceed P_MeNB and P_SeNB, this does not correspond to the power-restricted situation in association with the transmission power of a corresponding UE and thus, transmission power of an SRS for each cell group may be secured. That is, an SRS may be set to be transmitted to each BS in each cell group.

2. when the required power for the transmission of a PUCCH/PUSCH in an MeNB or an MCG is less than or equal to P_MeNB, when the required power for the transmission of a PUCCH/PUSCH in an SeNB or an SCG is less than or equal to P_SeNB, when the required power for transmission of a PUCCH/PUSCH/SRS in the MeNB or the MCG exceeds P_MeNB, and when the required power for transmission of a PUCCH/PUSCH/SRS in the SeNB or the SCG exceeds P_SeNB (Required Power for PUCCH/PUSCH on MeNB<=P_MeNB, Required Power for PUCCH/PUSCH on SeNB<=PSeNB and Required Power for PUCCH/PUSCH/SRS on MeNB>P_MeNB, Required Power for PUCCH/PUSCH/SRS on SeNB>PSeNB)

In case 2, the transmission power of at least a PUCCH/PUSCH is secured in each of the MCG and the SCG. However, when the required transmission power value of an SRS is included, the sum of required transmission power of the PUCCH/PUSCH/SRS may exceed P_MeNB and P_SeNB for uplink transmission, and thus, the sum of transmission power required from the UE for transmission to each BS may exceed the total maximum transmission power Pcmax that the UE may use for transmission. That is, the UE is in the power-restricted situation. In this instance, the transmission power of the SRS in each cell group may be assigned with the transmission power with the lowest priority. For example, each cell group scales the transmission power of an SRS down so as not to exceed Pcmax, or may drop the transmission of the corresponding SRS.

For another example, in association with the transmission of an SRS to different BSs, UL scheduling with respect to an MeNB may be considered to be important, and thus, the MeNB may be prioritized. For example, the transmission of an SRS to the SeNB may be scaled down or dropped, and scaling down may be considered with respect to the transmission of an SRS to the MeNB, under the condition that the transmission power does not exceed Pcmax. That is, the SRS transmission power of the MCG may be preferentially allocated rather than the SRS transmission power of the SCG.

For another example, in the above described case, the UE may preferentially allocate transmission power to an aperiodic SRS that is triggered from a BS, than a periodic SRS.

3. When the required power for transmission of a PUCCH/PUSCH in an MeNB or an MCG is less than or equal to P_MeNB, when the required power for transmission of a PUCCH/PUSCH in an SeNB or an SCG is less than or equal to P_SeNB, when the required power for transmission of a PUCCH/PUSCH/SRS in the MeNB or the MCG exceeds P_MeNB, and when the required power for transmission of a PUCCH/PUSCH/SRS in the SeNB or the SCG is less than or equal to P_SeNB (Required Power for PUCCH/PUSCH on MeNB<=P_MeNB, Required Power for PUCCH/PUSCH on SeNB<=PSeNB and Required Power for PUCCH/PUSCH/SRS on MeNB>P_MeNB, Required Power for PUCCH/PUSCH/SRS on SeNB<=PSeNB)

The transmission power of at least a PUCCH/PUSCH is secured in each of the MCG and the SCG. However, when a required transmission power value of an SRS is included, a sum of transmission power required from a UE exceeds the total maximum transmission power Pcmax that the UE may use for transmission, and thus, the UE is in a power-restricted situation. In this instance, the UE executes setting to secure the SRS transmission to the SeNB, and in association with the SRS transmission to the MeNB, may scale down transmission power for SRS transmission to not exceed Pcmax or drop the SRS transmission. That is, transmission power allocation is independently executed in each cell group and thus, the SRS transmission to the SeNB may be secured and the SRS transmission to the MeNB may be scaled down or may be dropped.

For another example, in association with the transmission of an SRS to different BSs, UL scheduling with respect to an MeNB may be considered to be important, and thus, the MeNB may be prioritized. Therefore, the SRS transmission to an SeNB may be scheduled down or dropped, and the SRS transmission to the MeNB may be scaled down to not exceed Pcmax.

For another example, in the above described case, an aperiodic SRS that is triggered from a BS may be preferentially allocated than a periodic SRS.

4. When the required power for transmission of a PUCCH/PUSCH in an MeNB or an MCG is less than or equal to P_MeNB, when the required power for transmission of a PUCCH/PUSCH in an SeNB or an SCG is less than or equal to P_SeNB, when the required power for transmission of a PUCCH/PUSCH/SRS in the MeNB or the MCG is less than or equal to P_MeNB, and when the required power for transmission of a PUCCH/PUSCH/SRS in the SeNB or the SCG exceeds P_SeNB (Required Power for PUCCH/PUSCH on MeNB<=P_MeNB, Required Power for PUCCH/PUSCH on SeNB<=PSeNB and Required Power for PUCCH/PUSCH/SRS on MeNB<=P_MeNB, Required Power for PUCCH/PUSCH/SRS on SeNB>PSeNB)

The transmission power of at least a PUCCH/PUSCH is secured in each of the MCG and the SCG. However, when a required transmission power value of an SRS is included, a sum of the transmission power required from a UE exceeds the total maximum transmission power Pcmax that the UE may use for transmission and thus, the UE is in a power-restricted situation. In this instance, the UE executes setting to secure the SRS transmission to the MeNB, and in association with the SRS transmission to the SeNB, may scale down the transmission power for SRS transmission to not exceed Pcmax or drop the SRS transmission.

For another example, in the above described case, an aperiodic SRS that is triggered from a BS may be preferentially allocated than a periodic SRS.

5. When the required power for transmission of a PUCCH/PUSCH in an MeNB or an MCG exceeds P_MeNB, when the required power for the transmission of a PUCCH/PUSCH in an SeNB or an SCG is less than or equal to P_SeNB, when the required power for the transmission of a PUCCH/PUSCH/SRS in the MeNB or the MCG exceeds P_MeNB, and when the required power for the transmission of a PUCCH/PUSCH/SRS in the SeNB or the SCG is less than or equal to P_SeNB (Required Power for PUCCH/PUSCH on MeNB>P_MeNB, Required Power for PUCCH/PUSCH on SeNB<=PSeNB and Required Power for PUCCH/PUSCH/SRS on MeNB>P_MeNB, Required Power for PUCCH/PUSCH/SRS on SeNB<=PSeNB)

In this instance, the UE may determine the final transmission power for the MeNB using one of the values in {(P_cmax–P_SeNB), (P_cmax–Required Power for PUCCH/PUSCH on P_SeNB), (Pcmax–Required Power for PUCCH/PUSCH/SRS on P_SeNB)} according to the condition for additional allocation of remaining power and a priority of a PUCCH/PUSCH. In this instance, the UE is in the power-restricted situation, and the transmission power of an SRS transmitted to the MeNB may be scaled or dropped based on the final transmission power for the MeNB. Also, a total sum of required power of a PUCCH/PUSCH/SRS for the SeNB does not exceed P_SeNB, the UE may secure transmission and transmit in association with an SRS transmitted to the SeNB.

For another example, the UE may scale down or drop the SRS transmission power with respect to an SeNB, in association with an SRS transmitted in the SeNB, when a required transmission power of a PUCCH/PUSCH that is to be transmitted to the MeNB is not satisfied. That is, the PUCCH/PUSCH that is to be transmitted to the MeNB may be preferentially allocated rather than the SRS transmission power of the SeNB.

For another example, in association with the transmission of an SRS to different BSs, UL scheduling with respect to an MeNB may be considered to be important, and thus, the MeNB may be prioritized. Therefore, the SRS transmission to an SeNB may be scheduled down or dropped, and the SRS transmission to the MeNB may be scaled down to not exceed Pcmax.

For another example, in the above described case, an aperiodic SRS that is triggered from a BS may be preferentially allocated rather than a periodic SRS.

6. When the required power for transmission of a PUCCH/PUSCH in an MeNB or an MCG exceeds P_MeNB, when the required power for transmission of a PUCCH/PUSCH in an SeNB or an SCG is less than or equal to P_SeNB, when the required power for transmission of a PUCCH/PUSCH/SRS in the MeNB or the MCG exceeds P_MeNB, and when the required power for transmission of a PUCCH/PUSCH/SRS in the SeNB or the SCG exceeds P_SeNB (Required Power for PUCCH/PUSCH on MeNB>P_MeNB, Required Power for PUCCH/PUSCH on SeNB<=PSeNB and Required Power for PUCCH/PUSCH/SRS on MeNB>P_MeNB, Required Power for PUCCH/PUSCH/SRS on SeNB>PSeNB)

In this instance, the UE may determine the final transmission power for the MeNB using one of the values in {(P_cmax–P_SeNB), (Pcmax–Required Power for PUCCH/PUSCH on P_SeNB), (Pcmax–Required Power for PUCCH/PUSCH/SRS on P_SeNB)} according to the condition for additional allocation of remaining power and a priority of a PUCCH/PUSCH. In this instance, the UE is in the power-restricted situation, and the transmission power of an SRS transmitted to the MeNB may be scaled or dropped based on the final transmission power for the MeNB. Also, the UE assigns the lowest priority to the SRS transmission to each cell group, and in association with corresponding SRS transmission, scales down the transmission power for transmission with respect to each BS to not exceed Pcmax or drop the SRS transmission for each cell group.

For another example, in association with the transmission of an SRS to different BSs, UL scheduling with respect to an MeNB may be considered to be important, and thus, the MeNB may be prioritized. Therefore, the SRS transmission to the SeNB may be scheduled down or dropped, and the SRS transmission to the MeNB may be scaled down to not exceed Pcmax.

For another example, in the above described case, an aperiodic SRS that is triggered from a BS may be preferentially allocated than a periodic SRS.

7. When the required power for transmission of a PUCCH/PUSCH in an MeNB or an MCG is less than or equal to P_MeNB, when the required power for transmission of a PUCCH/PUSCH in an SeNB or an SCG exceeds P_SeNB, when the required power for transmission of a PUCCH/PUSCH/SRS in the MeNB or the MCG is less than or equal to P_MeNB, and when the required power for transmission of a PUCCH/PUSCH/SRS in the SeNB or the SCG exceeds P_SeNB ((Required Power for PUCCH/PUSCH on MeNB<=P_MeNB, Required Power for PUCCH/PUSCH on SeNB>PSeNB and Required Power for PUCCH/PUSCH/SRS on MeNB<=P_MeNB, Required Power for PUCCH/PUSCH/SRS on SeNB>PSeNB))

In this instance, the UE may determine the final transmission power for the SeNB using one of the values in {(P_cmax−P_MeNB), (Pcmax−Required Power for PUCCH/PUSCH on P_MeNB), (Pcmax−Required Power for PUCCH/PUSCH/SRS on P_MeNB)} according to the condition for additional allocation of remaining power and a priority of a PUCCH/PUSCH.

In this instance, the UE is in the power-restricted situation and thus, may scale or drop the SRS transmission with respect to the SeNB, based on the final transmission power for the SeNB. Also, the transmission power of the PUCCH/PUSCH/SRS that is transmitted to the MeNB does not exceed P_MeNB, and thus, the UE may secure the SRS transmission.

For another example, the UE may also scale down or drop the transmission power associated with an SRS that is transmitted to the MeNB, when the required transmission power of a PUCCH/PUSCH that is to be transmitted to the SeNB is not satisfied.

For another example, in the above described case, an aperiodic SRS that is triggered from a BS may be preferentially allocated than a periodic SRS.

8. When the required power that is required for transmission of a PUCCH/PUSCH in an MeNB or an MCG is less than or equal to P_MeNB, when the required power that is required for transmission of a PUCCH/PUSCH in an SeNB or an SCG exceeds P_SeNB, when the required power for transmission of a PUCCH/PUSCH/SRS in the MeNB or the MCG exceeds P_MeNB, and when the required power for transmission of a PUCCH/PUSCH/SRS in the SeNB or the SCG exceeds P_SeNB (Required Power for PUCCH/PUSCH on MeNB<=P_MeNB, Required Power for PUCCH/PUSCH on SeNB>PSeNB and Required Power for PUCCH/PUSCH/SRS on MeNB>P_MeNB, Required Power for PUCCH/PUSCH/SRS on SeNB>PSeNB)

In this instance, the UE may determine the final transmission power for the SeNB using one of the values in {(P_cmax−P_MeNB), (Pcmax−Required Power for PUCCH/PUSCH on P_MeNB), (Pcmax−Required Power for PUCCH/PUSCH/SRS on P_MeNB)} according to the condition for additional allocation of remaining power and a priority of a PUCCH/PUSCH. In this instance, the UE is in a power-restricted situation and thus, may scale or drop the SRS transmission with respect to the SeNB, based on the final transmission power for the SeNB. In this instance, the UE assigns the lowest priority to the SRS transmission with respect to each cell group, and may scale down SRS transmission power in each cell group to not exceed at most the Pcmax or drop SRS transmission, in association with the corresponding SRS transmission.

For another example, the UE may also scale down or drop the transmission power associated with an SRS that is transmitted to the MeNB, when the required transmission power of a PUCCH/PUSCH to be transmitted to the SeNB is not satisfied.

For another example, UL scheduling with respect to the MeNB may be considered to be important in association with SRS transmission to different BSs. Accordingly, the MeNB may be prioritized and the transmission of an SRS to the SeNB may be scaled down or dropped, and the transmission of an SRS to the MeNB may be scaled down under the condition that the transmission power does not exceed Pcmax.

For another example, in the above described case, an aperiodic SRS that is triggered from a BS may be preferentially allocated than a periodic SRS.

Additionally, the present disclosure may be applied to the carrier aggregation through multiple carriers in each cell group. When uplink channels and uplink signals overlap in different carriers in each cell group, the existing Release-10/11 carrier aggregation mechanism may be used.

Hereinafter, a method of controlling transmission power for an uplink channel and an uplink signal in accordance with at least one embodiment of the present disclosure will be described briefly, from the perspective of a BS.

Figure 24:
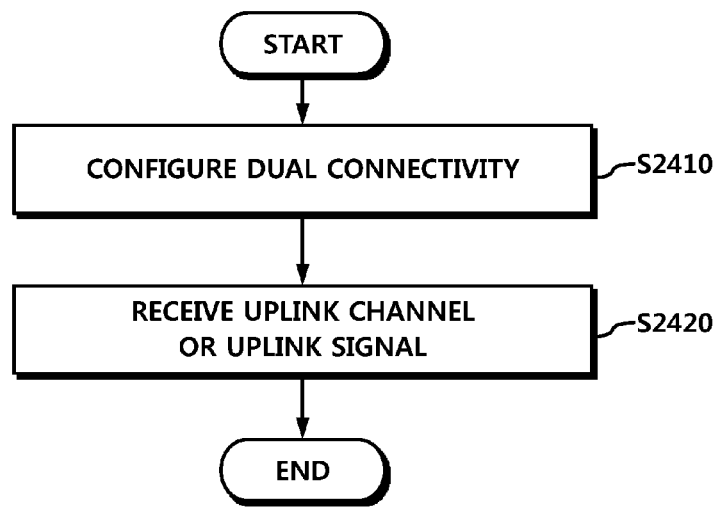
FIG. 24 is a diagram illustrating operations of a Base Station (BS) according to at least one embodiment of the present disclosure.

FIG. 24 is a diagram illustrating operations of a BS according to another embodiment of the present disclosure.

In accordance with another embodiment of the present disclosure, a method of a BS for receiving an uplink channel and an uplink signal, the method includes configuring dual connectivity with respect to a UE, and receiving, from the UE, an uplink channel and an uplink signal. Here, the uplink channel and the uplink signal may be received at the transmission power allocated based on at least one of: uplink maximum transmission power for each of a plurality of cell groups including one or more serving cells, a total sum of transmission power of an uplink channel and an uplink signal, and the total maximum transmission power of a UE. Also, the uplink channel may include a Physical Uplink Control Channel (PUCCH) or a Physical Uplink Shared Channel (PUSCH), and the uplink signal may include a Sounding Reference Signal (SRS).

Referring to FIG. 24, the method of the BS for receiving an uplink channel and an uplink signal includes an operation of configuring dual connectivity with respect to a UE in operation S2410. For example, the BS may be an MeNB or an SeNB. When the BS is the MeNB, the BS may configure the dual connectivity with respect to the UE, together with the SeNB. In the same manner, when the BS is the SeNB, the BS may configure the dual connectivity with respect to the UE, together with the MeNB. Through the above, the BS may configure a bearer as shown in FIG. 9 or FIG. 10, and may configure the dual connectivity with respect to the UE.

The method of the BS includes an operation of receiving an uplink channel and an uplink signal from the UE, in operation S2420. Here, the uplink channel and the uplink signal may be transmitted at the transmission power allocated based on at least one of: the uplink maximum transmission power for each of a plurality of cell groups including one or more serving cells, a total sum of transmission power of an uplink channel and an uplink signal, and the total maximum transmission power of a UE. The uplink channel and the uplink signal that the UE transmits may be received on a single subframe. Also, the uplink channel and the uplink signal may be a signal transmitted at the transmission power that is determined independently for each cell group for simultaneous transmission of uplink channels or for simultaneous transmission of an uplink channel and an uplink signal.

For an example, when a total sum of transmission power of an uplink channel and an uplink signal in a cell group associated with the BS is within the uplink maximum transmission power, the transmission power of an SRS may be independently allocated in the cell group associated with the BS.

For another example, when a total sum of transmission power of an uplink channel and an uplink signal in a cell group associated with the BS exceeds the uplink maximum transmission power, the transmission power of a PUCCH and a PUSCH may be preferentially allocated than the transmission power of an SRS.

For another example, the transmission power of a PUCCH and a PUSCH may be preferentially allocated than the transmission power of an SRS that is transmitted to another BS that configures the dual connectivity with respect to the UE together whit the BS.

For another example, the transmission power of an SRS may be preferentially allocated rather than the transmission power of an SRS that is transmitted to another BS that configures the dual connectivity with respect to the UE together with the BS, and the BS may be a BS that acts as a mobility anchor. That is, the BS in which SRS transmission is preferentially allocated may be the MeNB.

Additionally, the BS in accordance with at least one embodiment of the present disclosure may execute various operations required when the UE executes the operations in accordance with at least one embodiment of the present disclosure.

As described above, in accordance with at least one embodiment, there are provided a method and an apparatus for multiplexing and transmitting a plurality of uplink channels and uplink signals when a UE transmits uplink channels and uplink signals in a dual connectivity situation. Also, in accordance with at least one embodiment of the present disclosure, there are provide a method and an apparatus for allocating transmission power to each uplink channel and uplink signal when a UE transmits a plurality of channels and uplink signals. Particularly, in accordance with at least one embodiment of the present disclosure, there are provided a method and apparatus for determining a transmission power allocation priority among uplink channels and uplink signals, for transmitting a plurality of uplink channels and signals under the situation where transmission power is limited.

Also, when carrier aggregation between different types of BSs (that is, inter-BS carrier aggregation and supporting dual connectivity) is executed, and carrier aggregation is executed using carriers having identical or different TDD/FDD duplex modes, ambiguity in operations of a UE that operates based on configuring a PCell and an SCell among the UE and different types of BSs and ambiguity between a UE and a BS may be solved. Therefore, by accurately executing a connection procedure executed between a UE and a BS, transmission of uplink data and transmission of an uplink channel and an uplink signal, and transmission and reception of an uplink control channel including an HARQ operation, reliability of data transmission between a UE and different BSs and between UEs under different duplex modes may be secured. Through the above, the uplink/downlink data transmission rate may be improved.

Hereinafter, a UE and a BS will be described with reference to FIG. 25 and FIG. 26.

Figure 25:
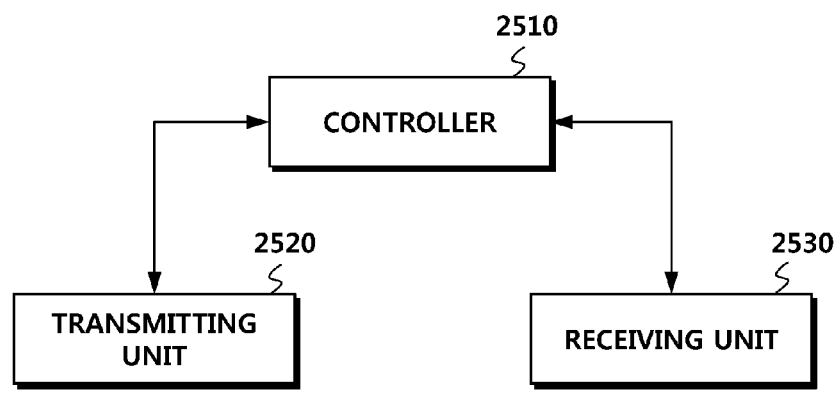
FIG. 25 is a block diagram illustrating a UE according to at least one embodiment of the present disclosure.

FIG. 25 illustrates a UE in accordance with at least one embodiment.

Referring to FIG. 25, a UE 2500 includes a receiving unit 2530, a controller 2510, and a transmitting unit 2520.

Particularly, the UE 2500 controls uplink transmission power. Such a UE 2500 may include a controller 2510 configured to set uplink maximum transmission power for each of a plurality of cell groups including one or more serving cells and configured to allocate transmission power for an uplink channel and an uplink signal based on at least one of the uplink maximum transmission power, a total sum of transmission power of one or more uplink channels and an uplink signal transmitted in each of the cell groups, and the total maximum transmission power of the UE. The UE 2500 may include a transmitting unit 2520 configured to transmit an uplink channel and an uplink signal, based on allocated transmission power. The uplink channel includes a Physical Uplink Control Channel (PUCCH) or a Physical Uplink Shared Channel (PUSCH), and the uplink signal includes a Sounding Reference Signal (SRS).

For an example, when the total sum of transmission power of an uplink channel and an uplink signal in each of the plurality of cell groups is within the uplink maximum transmission power, the controller 2510 may allocate transmission power of an SRS independently for each of the plurality of cell groups. Particularly, when the total sum of transmission power of an uplink channel and an uplink signal to be transmitted by a UE through a corresponding cell group or to the corresponding cell group is less than or equal to the uplink maximum transmission power set for a corresponding cell group, the UE may secure and allocate SRS transmission power included in the uplink channel and the uplink signal.

For another example, when the total sum of transmission power of an uplink channel and an uplink signal in a cell group out of the plurality of cell groups exceeds the uplink maximum transmission power of the corresponding cell group, the controller 2510 may preferentially allocate the transmission power of a PUCCH and a PUSCH than the transmission power of an SRS. Particularly, the controller 2510 may allocate transmission power for an uplink channel and an uplink signal, independently for each of the plurality of cell groups. However, when transmission power allocation with respect to an uplink channel and an uplink signal, which exceeds uplink maximum transmission power, is required, the controller 2510 may preferentially allocate the transmission power of a PUCCH and a PUSCH than the transmission power of an SRS. For example, the controller 2510 may preferentially allocate the transmission power of a PUCCH and a PUSCH in a corresponding cell group, and may scale down the transmission power of an SRS with respect to the uplink transmission power remaining after the allocation and executes transmission, or may drop the transmission of the SRS.

For another example, the controller 2510 may preferentially allocate the transmission power of a PUCCH and a PUSCH in one out of the plurality of cell groups than the transmission power of an SRS of another cell group. Particularly, the controller 2510 may transmit an uplink channel and an uplink signal, in each of the plurality of cell groups. In this instance, the controller 2510 preferentially allocates the transmission power of a PUCCH and a PUSCH in each cell group. That is, in the UE power-restricted situation where the sum of transmission power of an uplink channel and an uplink signal exceeds the total maximum transmission power, the transmission power of a PUCCH and a PUSCH in each cell group may be preferentially allocated than the transmission power of an SRS of another cell group. For example, the transmission power of a PUCCH and a PUSCH in an MCG may be preferentially allocated than the transmission power of an SRS in an SCG. In the same manner, the transmission power of a PUCCH and a PUSCH in an SCG may be preferentially allocated than the transmission power of an SRS in an MCG.

For another example, the controller 2510 may preferentially allocate the transmission power of an SRS of a cell group associated with a BS that acts as a mobility anchor out of the plurality of cell groups rather than the transmission power of an SRS of another cell group. As described above, a BS that acts as a mobility anchor with respect to a core network may exist in the dual connectivity situation. In the above descriptions, the BS is referred to as an MeNB. Therefore, under the UE power-restricted situation, the controller 2510 may preferentially allocate the transmission power of an SRS in an MCG associated with the MeNB than the transmission power of an SRS in an SCG.

Additionally, the controller 2510 may control the general operations of the UE for multiplexing an uplink channel and an uplink signal and for controlling transmission power in dual connectivity, which are required for implementing the present disclosure.

The receiving unit 2530 receives, from a BS, downlink control information, data, a message, through a corresponding channel. Also, the transmitting unit 2520 transmits, to a BS, uplink control information, data, and a message, through a corresponding channel.

Figure 26:
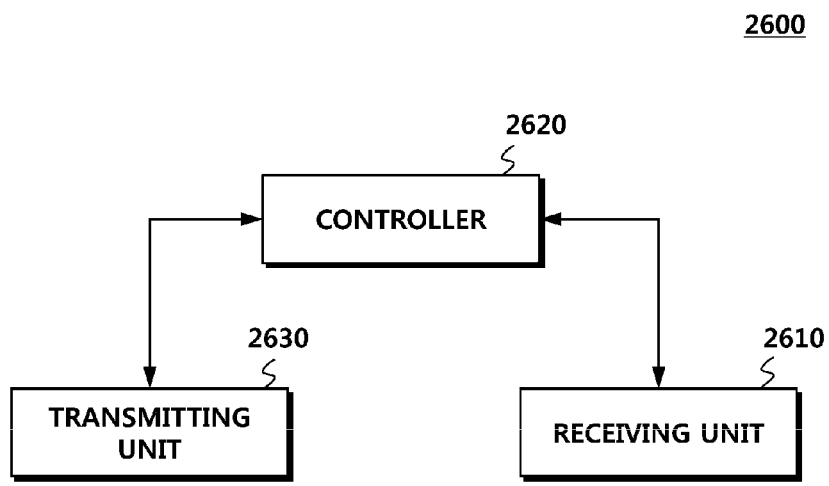
FIG. 26 is a block diagram illustrating BS according to at least one embodiment of the present disclosure.

FIG. 26 is a block diagram illustrating a configuration of a BS according to another embodiment of the present disclosure.

Referring to FIG. 26, a BS 2600 includes a controller 2620, a transmitting unit 2630, and a receiving unit 2610.

Particularly, the BS 2600 receives an uplink channel and an uplink signal. Such a BS 2600 may include the controller 2620 configured to form dual connectivity with respect to a UE and the receiving unit 2610 configured to receive an uplink channel and an uplink signal from a UE. The uplink channel and the uplink signal may be transmitted at the transmission power allocated based on at least one of: the uplink maximum transmission power for each of a plurality of cell groups including one or more serving cells, a total sum of transmission power of an uplink channel and an uplink signal, and the total maximum transmission power of a UE. The uplink channel may include a Physical Uplink Control Channel (PUCCH) or a Physical Uplink shared Channel (PUSCH), and the uplink signal may include a Sounding Reference Signal (SRS).

The controller 2620 may control the general operations of the BS for configuring dual connectivity with respect to a UE, for multiplexing an uplink channel and an uplink signal, and for controlling transmission power, which are required for implementing the present disclosure.

The transmitting unit 2630 and the receiving unit 2610 are used for transmitting/receiving, to/from a UE, a signal, a message, and data needed for implementing the aforementioned present disclosure.

Although the embodiments of the present disclosure have been described for illustrative purposes, those skilled in the art will appreciate that various modifications, additions and substitutions are possible, without departing from the scope and spirit of the invention. Accordingly, the embodiments disclosed in the present disclosure are merely to not limit but describe the technical spirit of the present disclosure. Further, the scope of the technical spirit of the present disclosure is limited by the embodiments. The scope of the present disclosure shall be construed on the basis of the accompanying claims in such a manner that all of the technical ideas included within the scope equivalent to the claims belong to the present disclosure.

What is claimed is:

1. A method of a User Equipment (UE) for controlling an uplink transmission power, the method comprising:
   setting an uplink maximum transmission power for each of a plurality of cell groups including one or more serving cells in such a way that a total sum of the uplink maximum transmission power for each of the plurality of cell groups does not exceed a total maximum transmission power of the UE; and
   allocating a transmission power for an uplink channel and an uplink signal based on at least one of: the uplink maximum transmission power, a total sum of the transmission power of one or more uplink channels and an uplink signal transmitted in each of the plurality of cell groups, and the total maximum transmission power of the UE,
   wherein the uplink channel includes a Physical Uplink Control Channel (PUCCH) or a Physical Uplink Shared Channel (PUSCH), and the uplink signal includes a Sounding Reference Signal (SRS);
   wherein, when the total sum of the transmission power of the uplink channel and the uplink signal in each of the plurality of cell groups does not exceed the uplink maximum transmission power for a corresponding cell group, a transmission power of the SRS is allocated independently in each of the plurality of cell groups; and
   wherein, when the total sum of the uplink channel and the uplink signal in a cell group from among the plurality of cell groups exceeds the uplink maximum transmission power of the cell group, a transmission power of the PUCCH and the PUSCH is allocated preferentially rather than a transmission power of the SRS.

2. The method of claim 1, wherein a transmission power of the PUCCH and the PUSCH in a cell group from among the plurality of cell groups is allocated preferentially rather than a transmission power of an SRS of another cell group.

3. The method of claim 1, wherein a transmission power of an SRS of a cell group which is associated with a Base Station (BS) that acts as a mobility anchor, from among the plurality of cell groups, is allocated preferentially rather than a transmission power of an SRS of another cell group.

4. A method of a Base Station (BS) for receiving an uplink channel and an uplink signal, the method comprising:
   configuring dual connectivity with respect to a User Equipment (UE); and receiving an uplink channel and an uplink signal from the UE, wherein the uplink channel and the uplink signal are transmitted with a transmission power allocated based on at least one of: an uplink maximum transmission power of each of a plurality of cell groups including one or more serving cells, a total sum of the transmission power of the uplink channel and the uplink signal, and a total maximum transmission power of the UE;

wherein the uplink maximum transmission power for each of the plurality of cell groups is set in such a way that a total sum of the uplink maximum transmission power for each of the plurality of cell groups does not exceed the total maximum transmission power of the UE;

wherein the uplink channel includes a Physical Uplink Control Channel (PUCCH) or Physical Uplink Shared Channel (PUSCH), and the uplink signal includes a Sounding Reference Signal (SRS);

wherein, when the total sum of the transmission power of the uplink channel and the uplink signal in a cell group associated with the BS does not exceed the uplink maximum transmission power for the cell group, a transmission power of the SRS is allocated independently in the cell group associated with the BS; and wherein, when the total sum of the transmission power of the uplink channel and the uplink signal in the cell group associated with the BS, exceeds the uplink maximum transmission power, a transmission power of the PUCCH and the PUSCH is allocated preferentially than the transmission power of the SRS.

5. The method of claim 4, wherein a transmission of the PUCCH and PUSCH is allocated preferentially rather than a transmission power of an SRS that is transmitted to another BS which configures dual connectivity with respect to the UE, together with the BS.

6. The method of claim 4, wherein the transmission power of the SRS is allocated preferentially rather than a transmission power of an SRS that is transmitted to another BS which configures dual connectivity with respect to the UE, together with the BS; and the BS is a BS that acts as a mobility anchor.

7. A User Equipment (UE) for controlling an uplink transmission power, the UE comprising:

a controller configured to set an uplink maximum transmission power for each of a plurality of cell groups including one or more serving cells, and configured to allocate a transmission power for an uplink channel and an uplink signal, based on at least one of the uplink maximum transmission power, a total sum of the transmission power of one or more uplink channels and an uplink signal transmitted in each of the plurality of cell groups, and a total maximum transmission power of the UE; and a transmitting unit configured to transmit the uplink channel and the uplink signal, based on the allocated transmission power, wherein the uplink channel includes a Physical Uplink Control Channel (PUCCH) or a Physical Uplink Shared Channel (PUSCH), and the uplink signal includes a Sounding Reference Signal (SRS);

wherein the controller is configured to set the uplink maximum transmission power for each of the plurality of cell groups in such a way that a total sum of the uplink maximum transmission power for each of the plurality of cell groups does not exceed the total maximum transmission power of the UE;

wherein, when the total sum of the transmission power of the uplink channel and the uplink signal in each of the plurality of cell groups does not exceed the uplink maximum transmission power for a corresponding cell group, the controller is configured to allocate a transmission power of the SRS independently in each of the plurality of cell groups; and wherein, when the total sum of the transmission power of the uplink channel and the uplink signal in a cell group out of the plurality of cell groups exceeds the uplink maximum transmissions power of the cell group, the controller preferentially allocates a transmission power of the PUCCH and the PUSCH rather than a transmission power of the SRS.

8. The UE of claim 7, wherein the controller preferentially allocates a transmission power of the PUCCH and the PUSCH in one of the plurality of cell groups, rather than a transmission power of an SRS of another cell group.

9. The UE of claim 7, wherein the controller preferentially allocates a transmission power of an SRS of a cell group associated with a BS that acts as a mobility anchor from among the plurality of cell groups, rather than a transmission power of an SRS of another cell group.

* * * * *